US006268749B1

(12) United States Patent
Fisch et al.

(10) Patent No.: US 6,268,749 B1
(45) Date of Patent: Jul. 31, 2001

(54) CORE CLOCK CORRECTION IN A 2/N MODE CLOCKING SCHEME

(75) Inventors: Matthew A. Fisch; Chakrapani Pathikonda, both of Beaverton; Javed S. Barkatullah, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/586,396

(22) Filed: May 31, 2000

Related U.S. Application Data

(62) Division of application No. 09/170,997, filed on Oct. 13, 1998, which is a division of application No. 08/709,379, filed on Aug. 30, 1996, now abandoned, which is a continuation-in-part of application No. 08/581,400, filed on Dec. 29, 1995, now abandoned.

(51) Int. Cl.[7] ........................................................ H03L 7/00
(52) U.S. Cl. ............................ 327/147; 327/150; 327/159; 327/295; 327/297
(58) Field of Search ................................... 327/147, 150, 327/159, 295, 297

(56) References Cited

U.S. PATENT DOCUMENTS

| | | |
|---|---|---|
| 3,096,338 | 7/1963 | Dehnert . |
| 3,391,585 | 7/1968 | Griswold et al. . |
| 3,623,017 | 11/1971 | Lowell et al. . |
| 3,715,729 | 2/1973 | Mercy . |
| 3,895,311 | 7/1975 | Basse et al. . |
| 3,919,695 | 11/1975 | Gooding . |

(List continued on next page.)

FOREIGN PATENT DOCUMENTS

| | | |
|---|---|---|
| 0103755A2 | 3/1984 | (EP) . |
| 0140814A3 | 5/1985 | (EP) . |
| 0167853A3 | 6/1985 | (EP) . |
| 0242010A1 | 12/1987 | (EP) . |
| 0368144 | 11/1988 | (EP) . |
| 0366250 | 5/1990 | (EP) . |
| 0375794 | 7/1990 | (EP) . |
| 0385567 | 9/1990 | (EP) . |
| 0419908 | 4/1991 | (EP) . |
| 0451661 | 10/1991 | (EP) . |

(List continued on next page.)

OTHER PUBLICATIONS

Kurpanek, et al., "PA7200: A PA–RISC Processor with Integrated High Performance MP Bus Interface", pp. 375–382, IEEE 1994.
Wilson, "MIPS rethinks RISC with superpipelining", Computer Design vol. 30, Issue 3, pp. 28–31, Feb. 1, 1991.
Slater, "MIPS previews 64–bit R4000 architecture", Microprocessor Report, vol. 5, No. 2, pp. 1–7, Feb. 6, 1991.
Intel, "Automotive Components Handbook", 1988.
Burke, et al. "IBM shows tabletPC, compact desktop", Comdex–PC Week, Nov. 23, 1992.
Motorola, Inc. "R1", Motorola, Inc. 1990.

(List continued on next page.)

*Primary Examiner*—Margaret R. Wambach
(74) *Attorney, Agent, or Firm*—Blakely, Sokoloff, Taylor & Zafman LLP

(57) ABSTRACT

A 2/N mode clock generator that generates bus clock signals through the use of bus clock enable signals selecting bus clock pulses that are in phase and out of phase with a core clock signal. The clock generator maintains synchronization between the bus clock signal and the core clock signal so that they are always in a predetermined phase relationship.

21 Claims, 19 Drawing Sheets

U.S. PATENT DOCUMENTS

| | | |
|---|---|---|
| 3,931,585 | 1/1976 | Barker et al. . |
| 3,936,762 | 2/1976 | Cox, Jr. et al. . |
| 4,077,016 | 2/1978 | Sanders et al. . |
| 4,095,267 | 6/1978 | Morimoto . |
| 4,143,418 | 3/1979 | Hodge et al. . |
| 4,145,761 | 3/1979 | Gunter et al. . |
| 4,203,153 | 5/1980 | Boyd . |
| 4,264,863 | 4/1981 | Kojima . |
| 4,293,927 | 10/1981 | Hoshii . |
| 4,300,019 | 11/1981 | Toyomaki . |
| 4,365,290 | 12/1982 | Nelms et al. . |
| 4,405,898 | 9/1983 | Flemming . |
| 4,419,756 | 12/1983 | Cheng-Quispe et al. . |
| 4,438,490 | 3/1984 | Wilder, Jr. . |
| 4,479,191 | 10/1984 | Nojima . |
| 4,493,971 | 1/1985 | Nawa et al. . |
| 4,615,005 | 9/1986 | Maejima et al. . |
| 4,639,864 | 1/1987 | Katzman et al. . |
| 4,667,289 | 5/1987 | Yoshida et al. . |
| 4,669,099 | 5/1987 | Zinn . |
| 4,694,393 | 9/1987 | Hirano et al. . |
| 4,698,748 | 10/1987 | Juzswik et al. . |
| 4,758,945 | 7/1988 | Remedi . |
| 4,766,567 | 8/1988 | Kato . |
| 4,779,093 | 10/1988 | Watkins . |
| 4,780,836 | 10/1988 | Miyazaki et al. . |
| 4,780,843 | 10/1988 | Tietjen . |
| 4,814,591 | 3/1989 | Nara et al. . |
| 4,823,292 | 4/1989 | Hillion . |
| 4,841,440 | 6/1989 | Yonezu et al. . |
| 4,873,703 | 10/1989 | Crandell et al. . |
| 4,881,165 | 11/1989 | Sager et al. . |
| 4,881,205 | 11/1989 | Aihara . |
| 4,881,364 | 11/1989 | Grenzebach . |
| 4,896,260 | 1/1990 | Hyatt . |
| 4,907,183 | 3/1990 | Tanaka . |
| 4,922,450 | 5/1990 | Rose et al. . |
| 4,931,748 | 6/1990 | McDermott et al. . |
| 4,935,863 | 6/1990 | Calvas et al. . |
| 4,967,895 | 11/1990 | Speas . |
| 4,979,097 | 12/1990 | Triolo et al. . |
| 4,979,190 | 12/1990 | Sager et al. . |
| 4,980,836 | 12/1990 | Carter et al. . |
| 4,991,129 | 2/1991 | Swartz et al. . |
| 5,003,537 | 3/1991 | Sager . |
| 5,018,170 | 5/1991 | Wilson . |
| 5,021,679 | 6/1991 | Fairbanks et al. . |
| 5,025,387 | 6/1991 | Frane . |
| 5,041,962 | 8/1991 | Lunsford . |
| 5,058,203 | 10/1991 | Inagami . |
| 5,059,924 | 10/1991 | Check . |
| 5,077,686 | 12/1991 | Rubinstein . |
| 5,083,266 | 1/1992 | Watanabe . |
| 5,103,114 | 4/1992 | Fitch . |
| 5,117,443 | 5/1992 | Shires . |
| 5,123,107 | 6/1992 | Mensch, Jr. . |
| 5,125,088 | 6/1992 | Culley . |
| 5,129,091 | 7/1992 | Yorimoto et al. . |
| 5,133,064 | 7/1992 | Hotta et al. . |
| 5,151,992 | 9/1992 | Nagae . |
| 5,167,024 | 11/1992 | Smith et al. . |
| 5,175,845 | 12/1992 | Little . |
| 5,175,853 | 12/1992 | Kardach et al. . |
| 5,191,657 | 3/1993 | Ludwig et al. . |
| 5,210,858 | 5/1993 | Jensen et al. . |
| 5,220,672 | 6/1993 | Nakao et al. . |
| 5,235,698 | 8/1993 | Lan . |
| 5,239,631 | 8/1993 | Boury et al. . |
| 5,239,652 | 8/1993 | Seibert et al. . |
| 5,243,703 | 9/1993 | Farmwald et al. . |
| 5,249,298 | 9/1993 | Bolan et al. . |
| 5,251,320 | 10/1993 | Kuzawinski et al. . |
| 5,256,912 | 10/1993 | Rios . |
| 5,256,994 | 10/1993 | Langendorf . |
| 5,263,172 | 11/1993 | Olnowich . |
| 5,276,824 | 1/1994 | Skruhak et al. . |
| 5,287,384 | 2/1994 | Avery et al. . |
| 5,305,452 | 4/1994 | Khan et al. . |
| 5,319,771 | 6/1994 | Takeda . |
| 5,319,772 | 6/1994 | Hwang . |
| 5,336,939 | 8/1994 | Eitrheim et al. . |
| 5,345,109 | 9/1994 | Mehta . |
| 5,347,559 | 9/1994 | Hawkins et al. . |
| 5,349,544 | 9/1994 | Wright et al. . |
| 5,355,502 | 10/1994 | Schowe et al. . |
| 5,355,562 | 10/1994 | Matoba et al. . |
| 5,359,232 | 10/1994 | Eitrheim et al. . |
| 5,359,630 | 10/1994 | Wade et al. . |
| 5,371,880 | 12/1994 | Bhattacharya . |
| 5,381,542 | 1/1995 | Carlson . |
| 5,388,249 | 2/1995 | Hotta et al. . |
| 5,388,250 | 2/1995 | Lewis et al. . |
| 5,392,422 | 2/1995 | Hoel et al. . |
| 5,392,437 | 2/1995 | Matter et al. . |
| 5,408,641 | 4/1995 | Gagliardo et al. . |
| 5,426,755 | 6/1995 | Yokouchi et al. . |
| 5,428,765 | 6/1995 | Moore . |

FOREIGN PATENT DOCUMENTS

| | | |
|---|---|---|
| 0478132 | 4/1992 | (EP) . |
| 0645717 | 3/1995 | (EP) . |
| 94306556 | 8/1995 | (EP) . |
| 2010551 | 6/1979 | (GB) . |
| 2130765 | 6/1984 | (GB) . |

OTHER PUBLICATIONS

B. Case, "R400 extends R3000 architecture with 64–bit capabilities", Microprocessor Report vol.5 Issue 19, pp. 10–14, Oct. 16, 1991.

Popescu, et al., "The Metaflow Architecture" IEEE Micro, pp.10–13 & 63–73, 1991.

IBM Technical Disclosure Bulletin, vol. 33, No. 6B, Nov. 1990, New York, "Multiple Phase Clock Generation From a Single Osciallator", pp. 322–325.

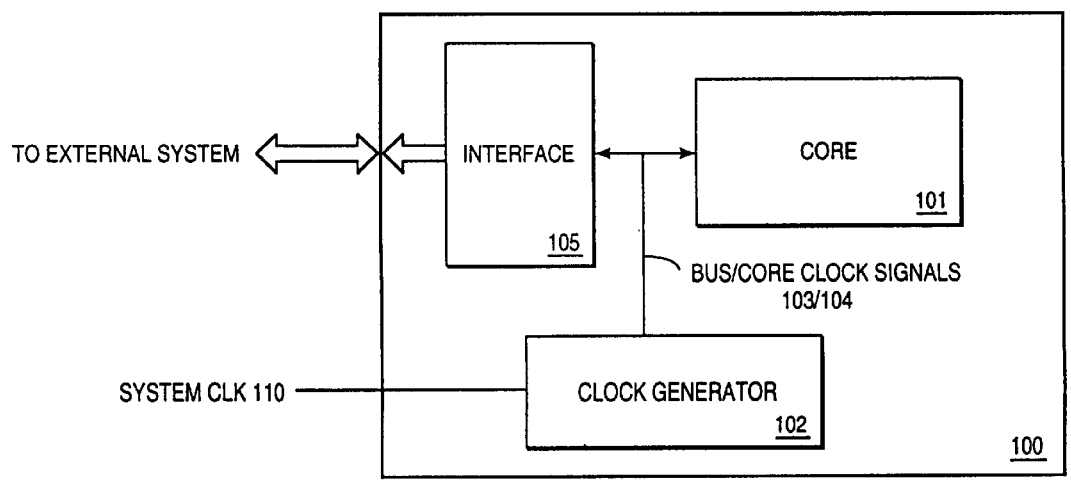
FIG_1
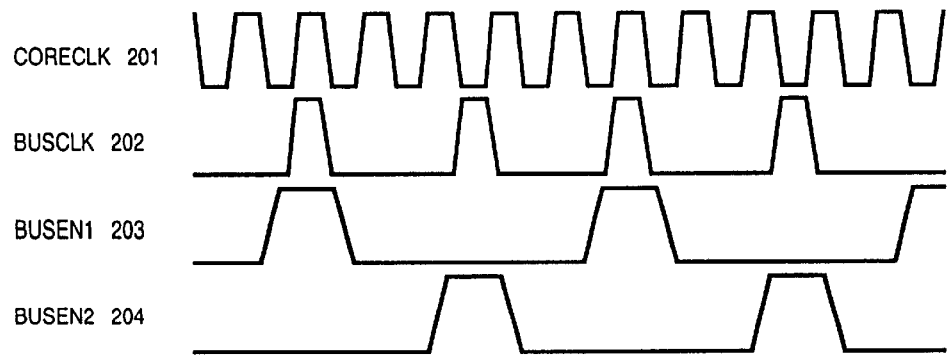
FIG_2

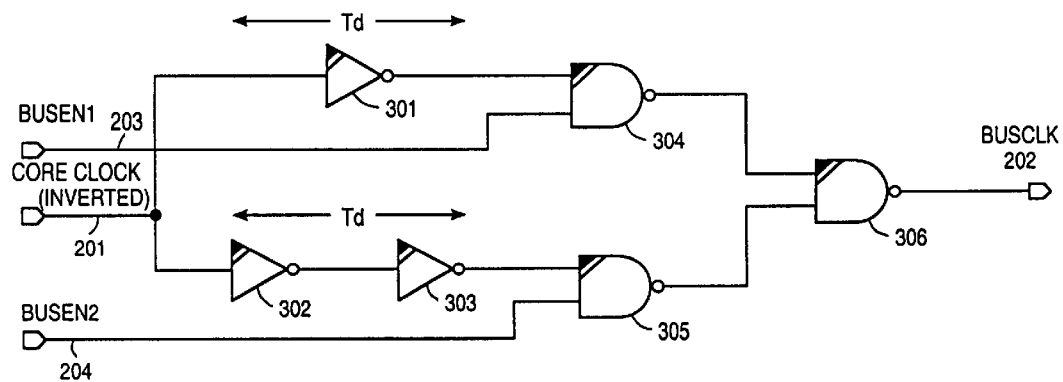
FIG_3
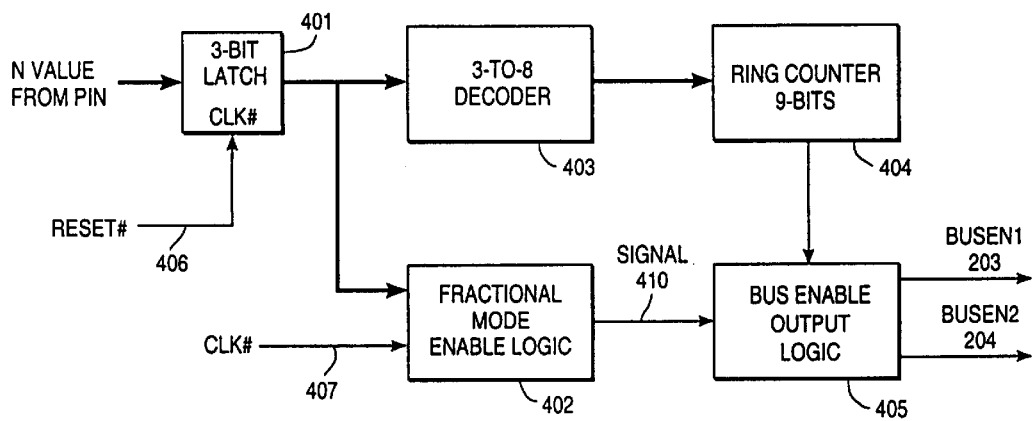
FIG_4

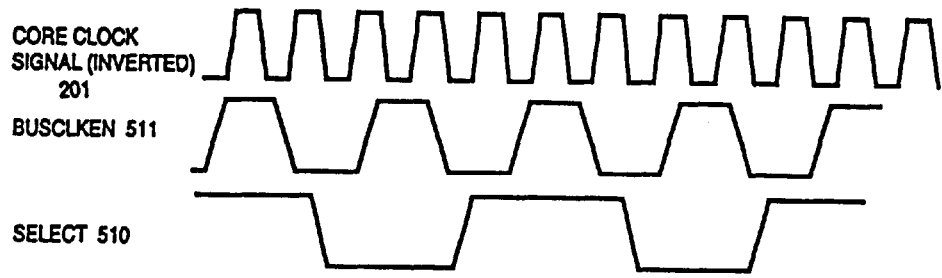
FIG_5A
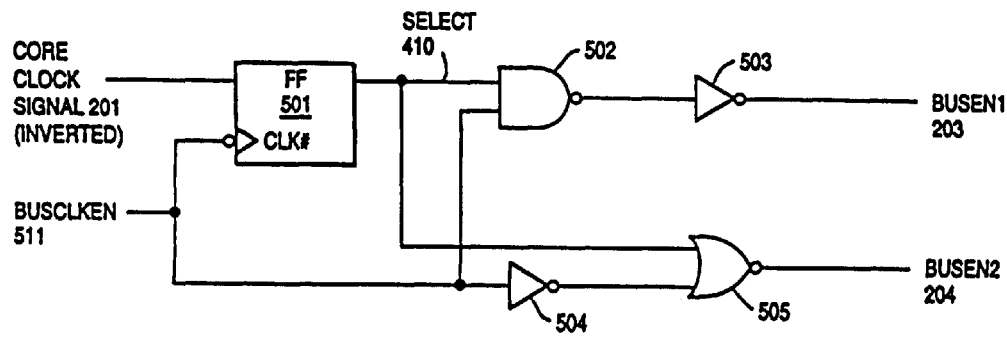
FIG_5B
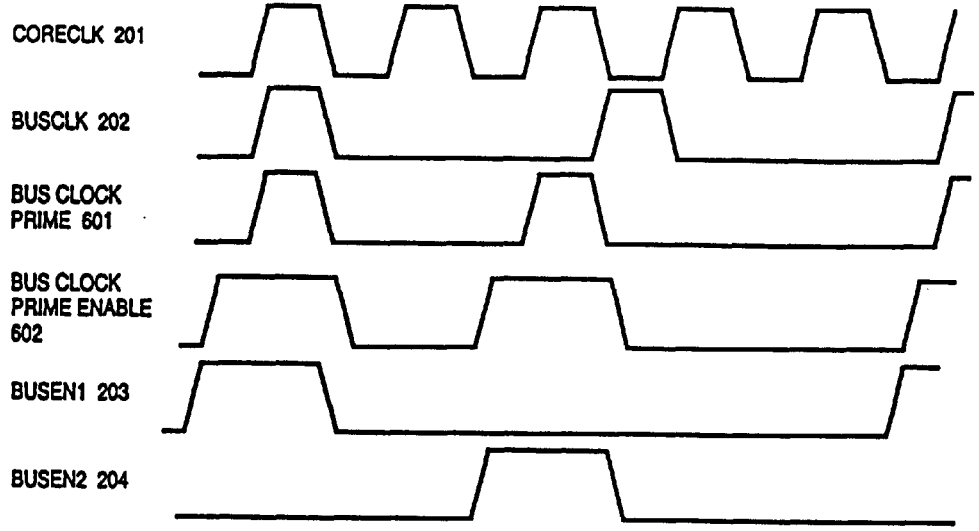
FIG_6A

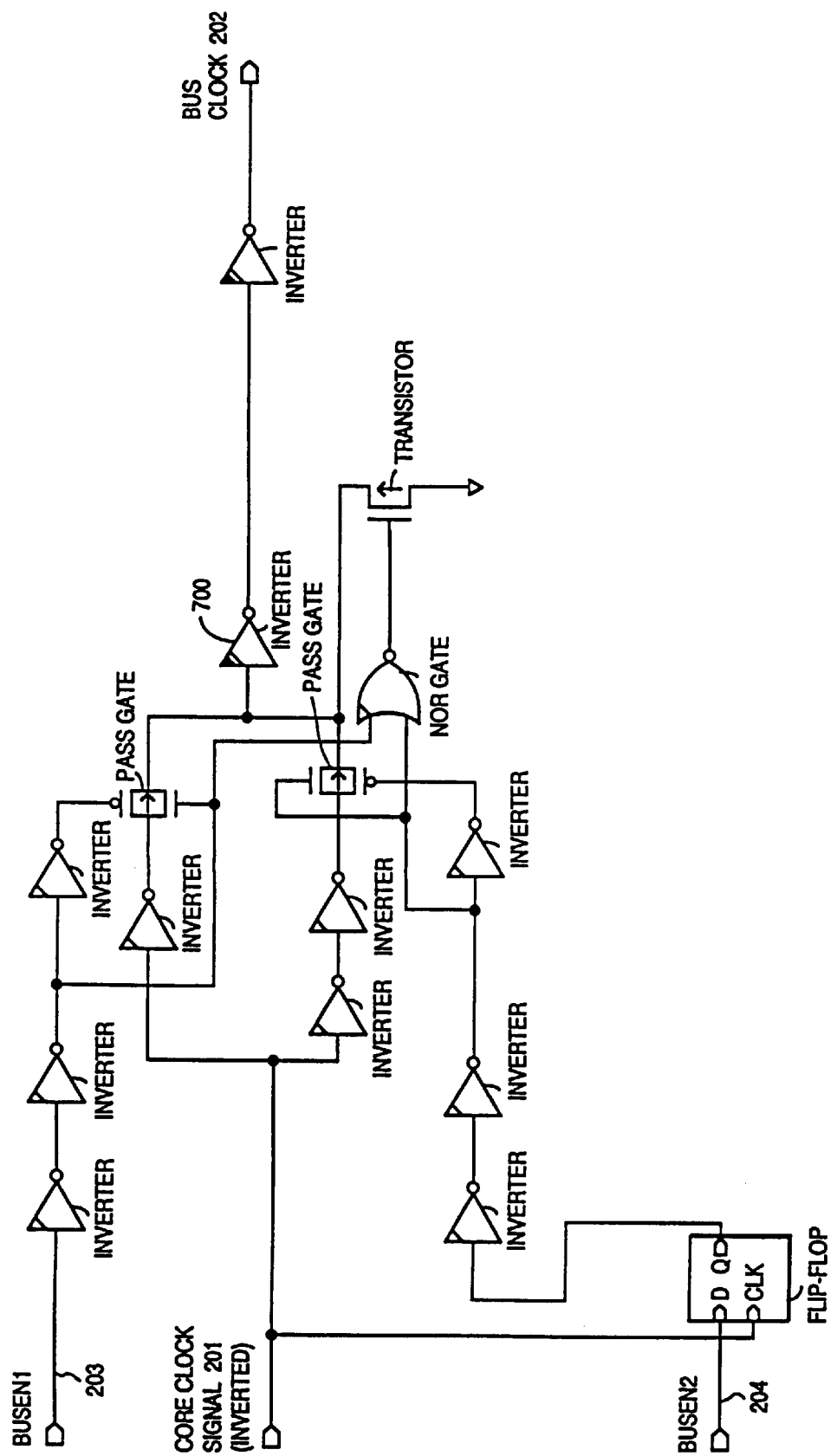
FIG_7

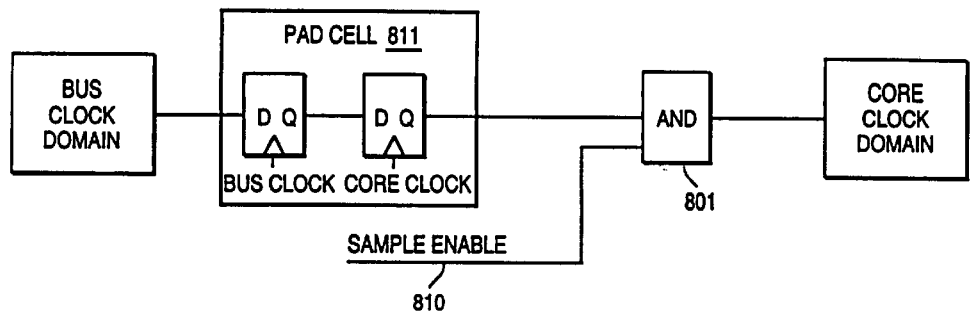
FIG_8A
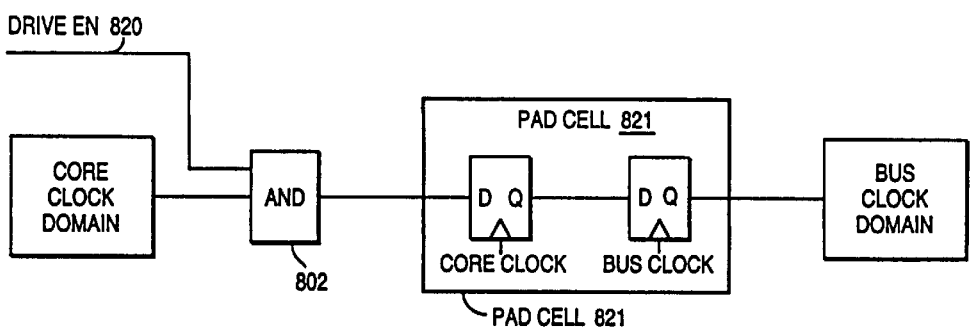
FIG_8B
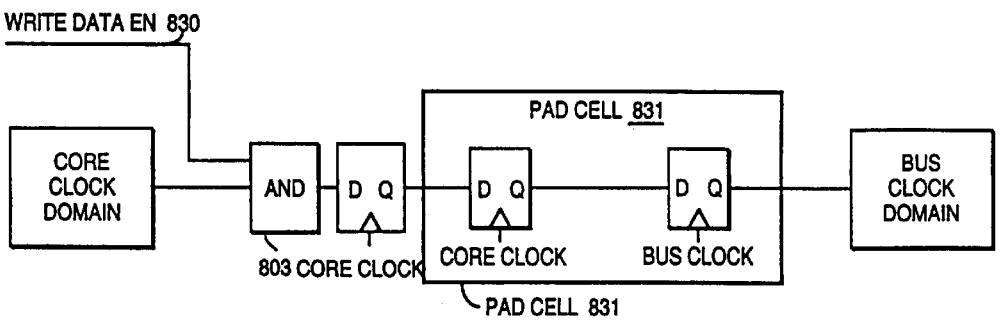
FIG_8C

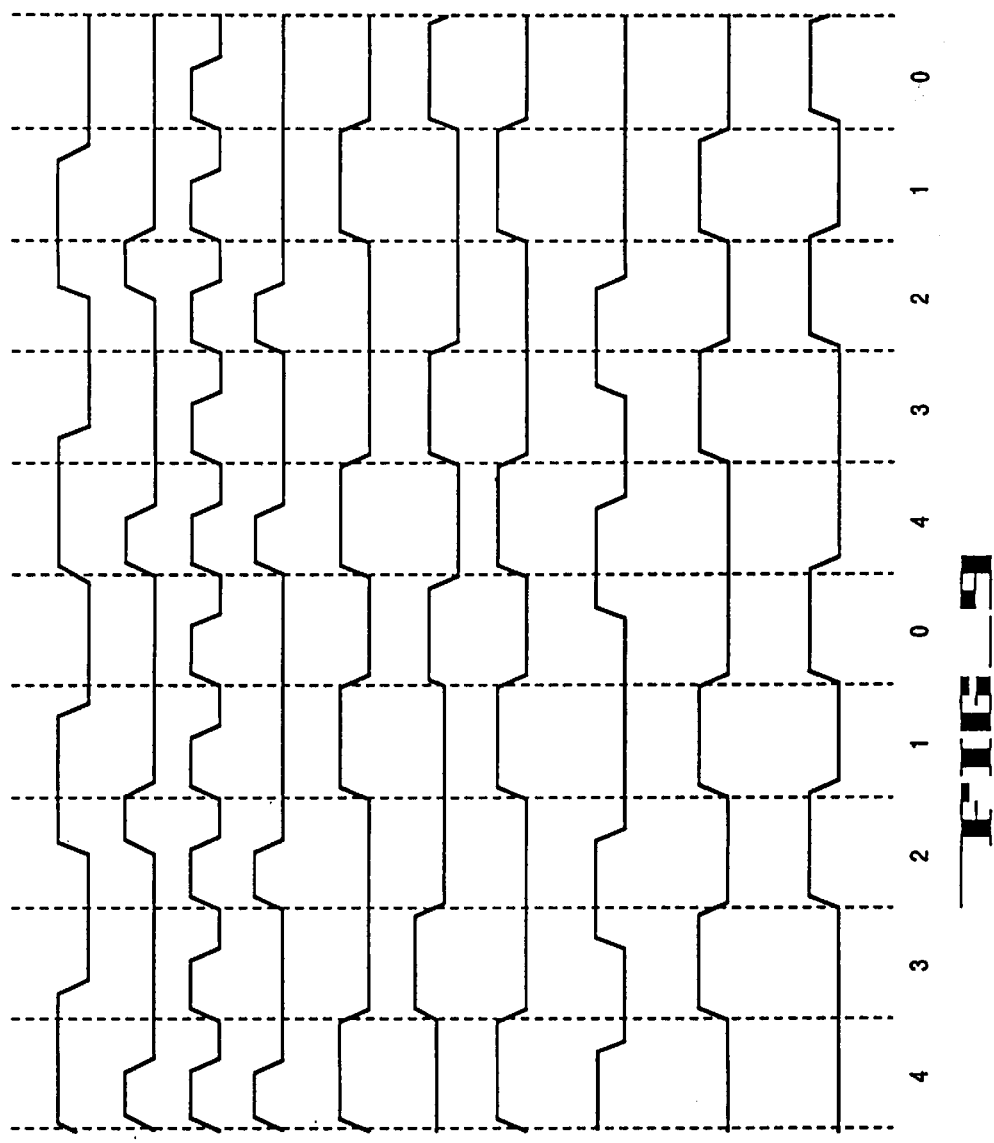

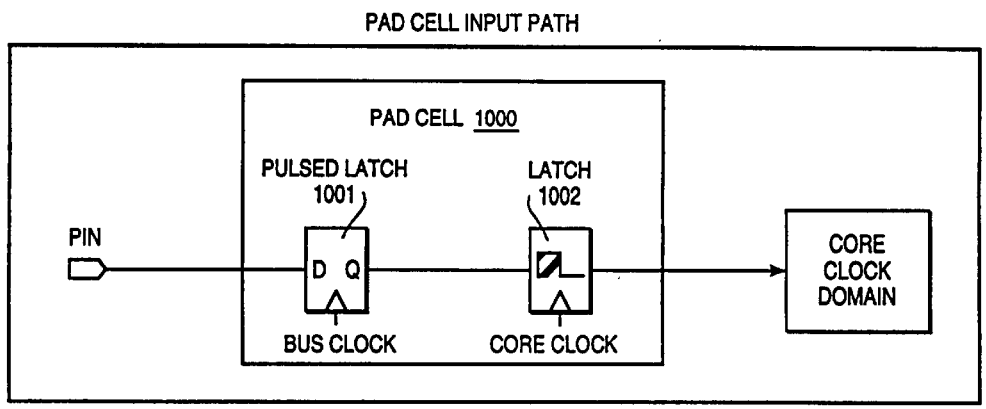
FIG_10
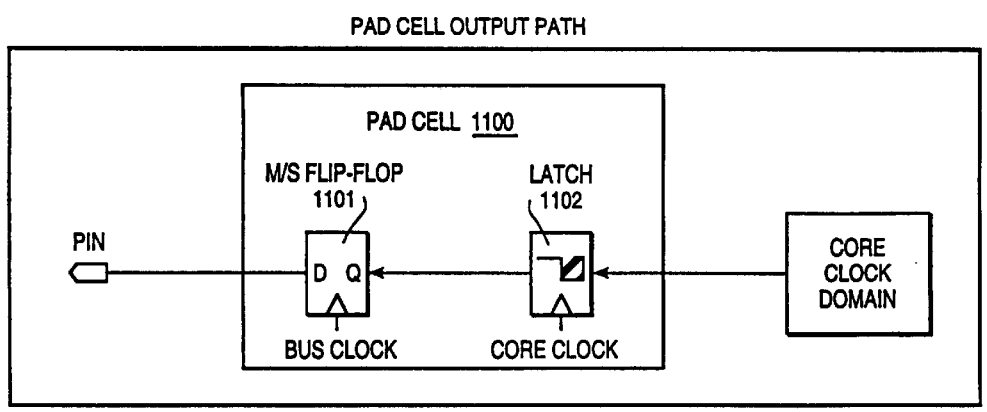
FIG_11

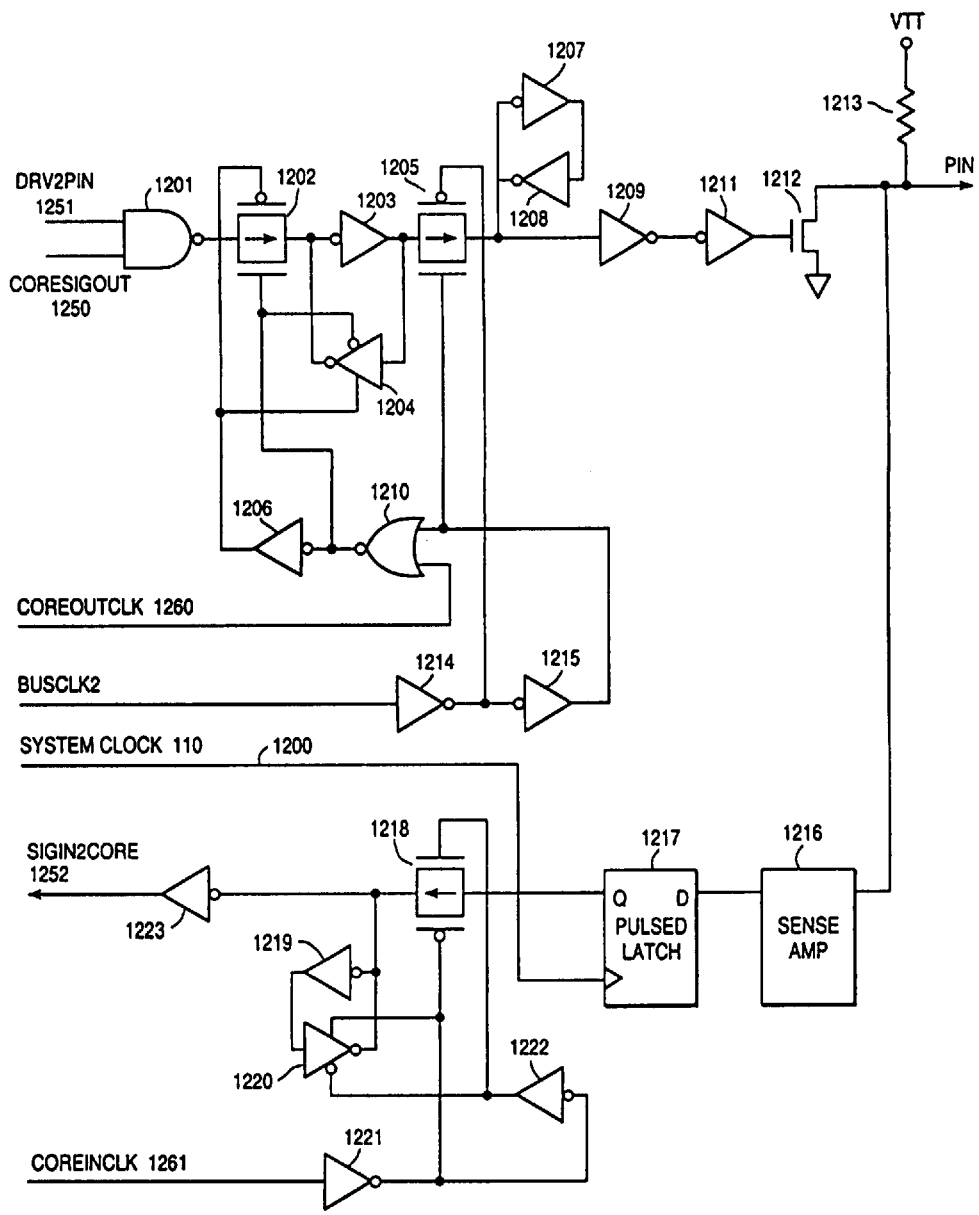
FIG_12

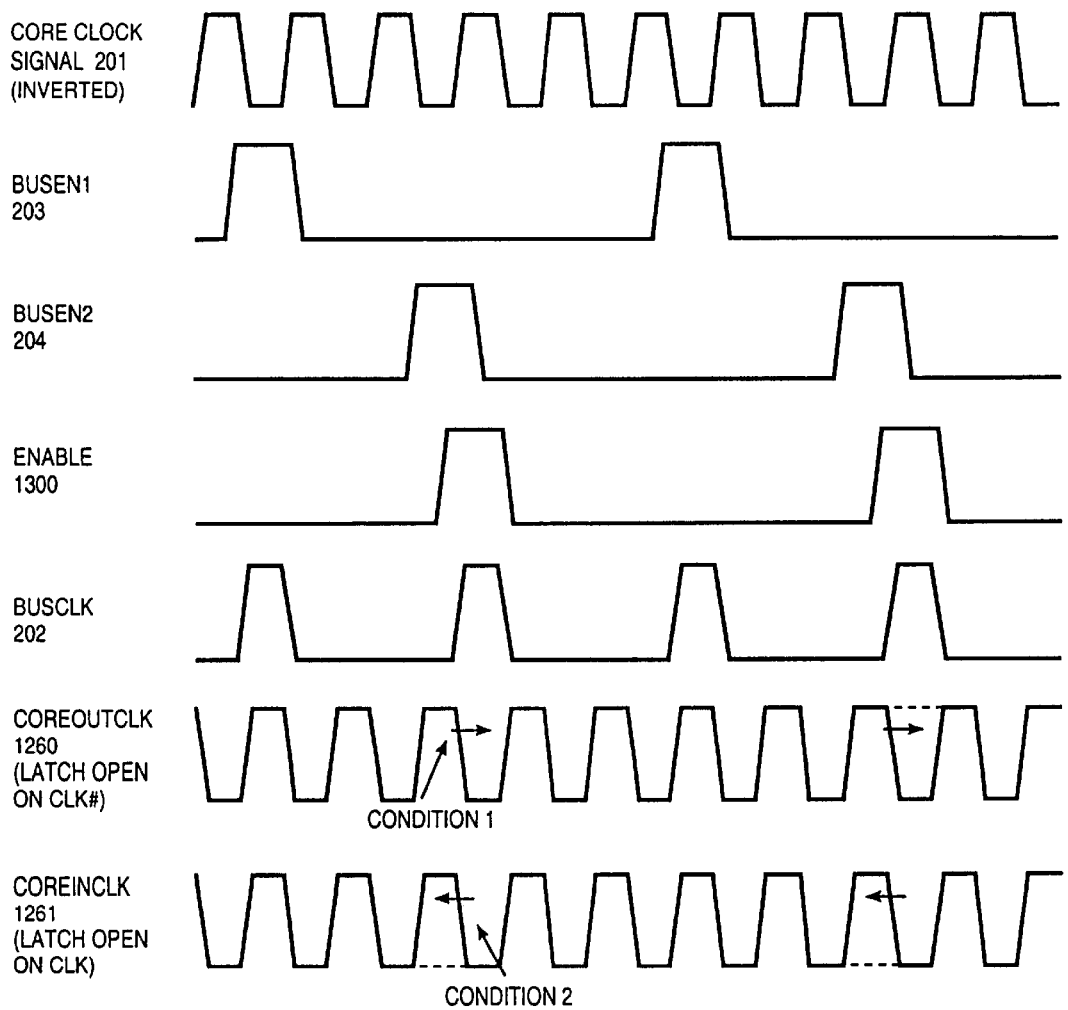
FIG_13

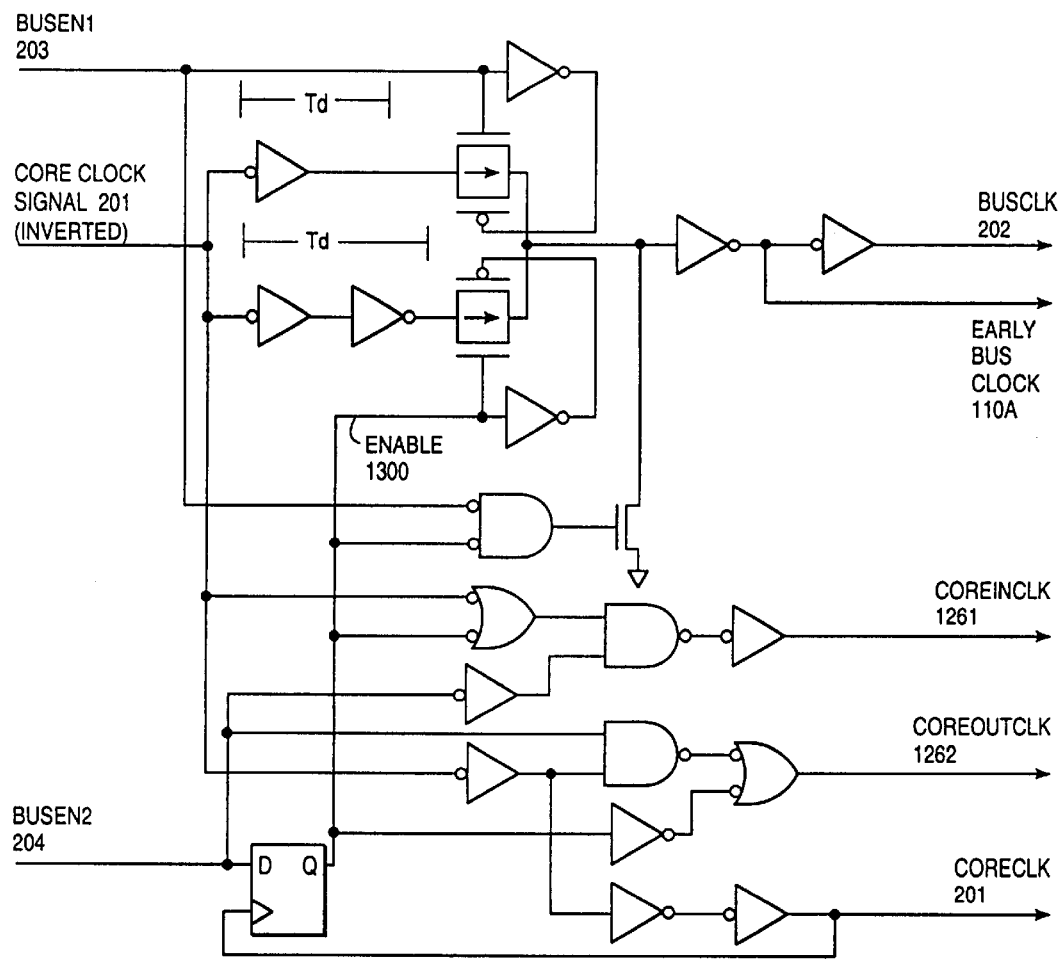
FIG_14

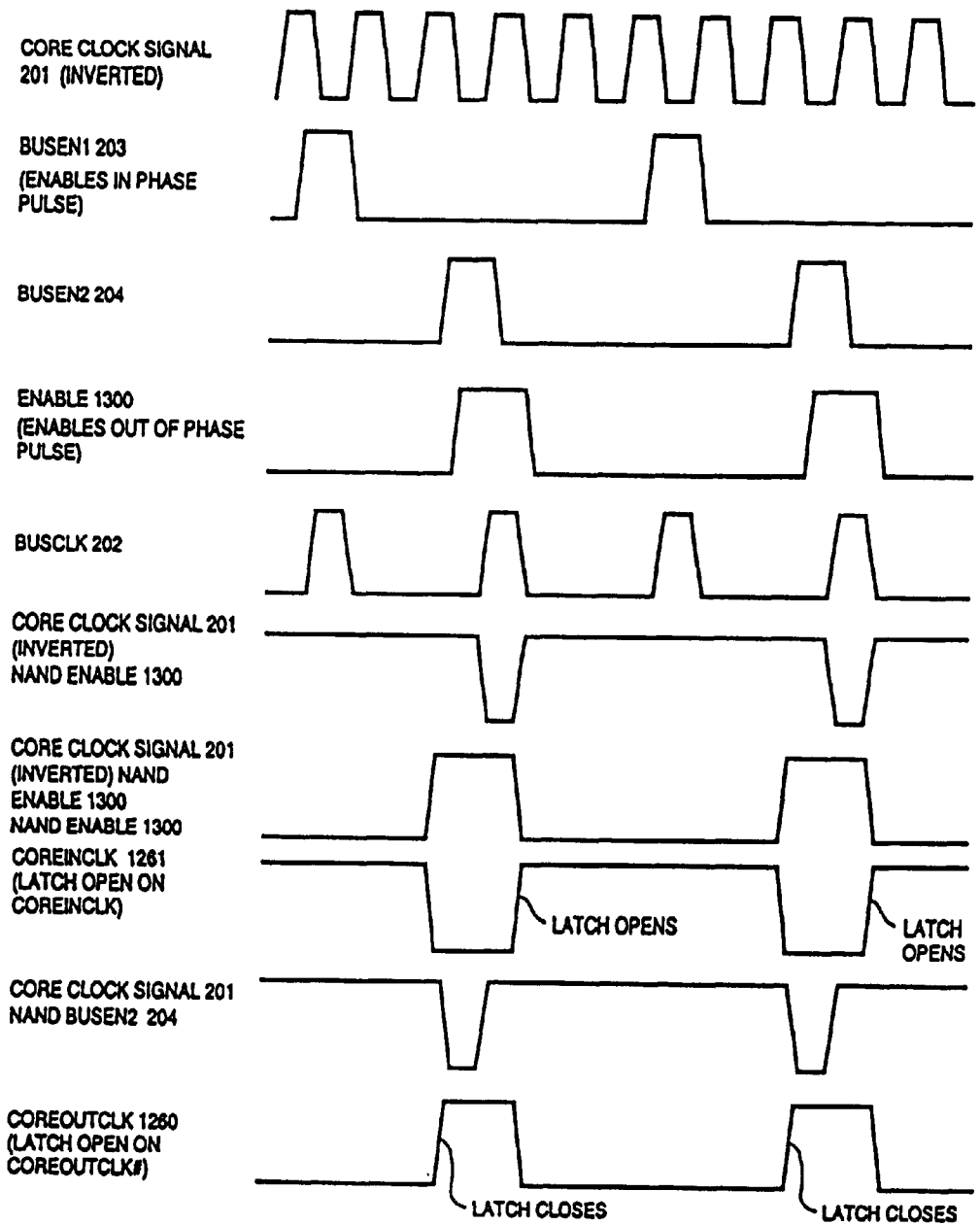
FIG_15

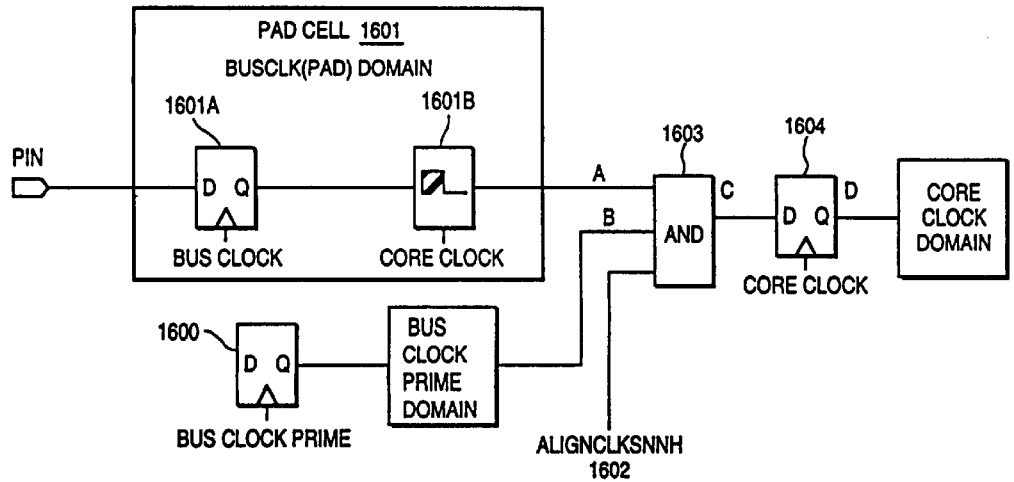
FIG_16
2/5 FRACTIONAL SPEED BUS
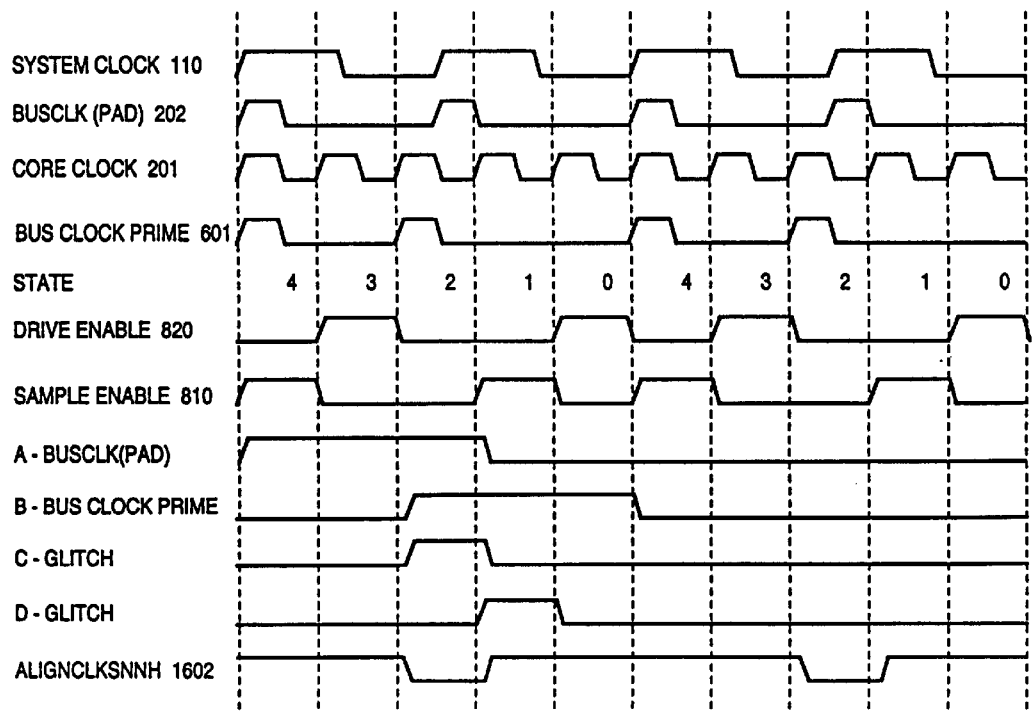
FIG_17

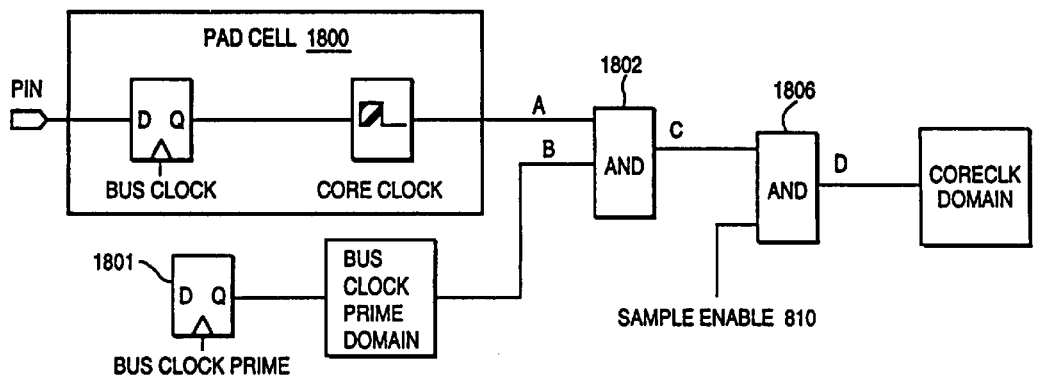
FIG__18A
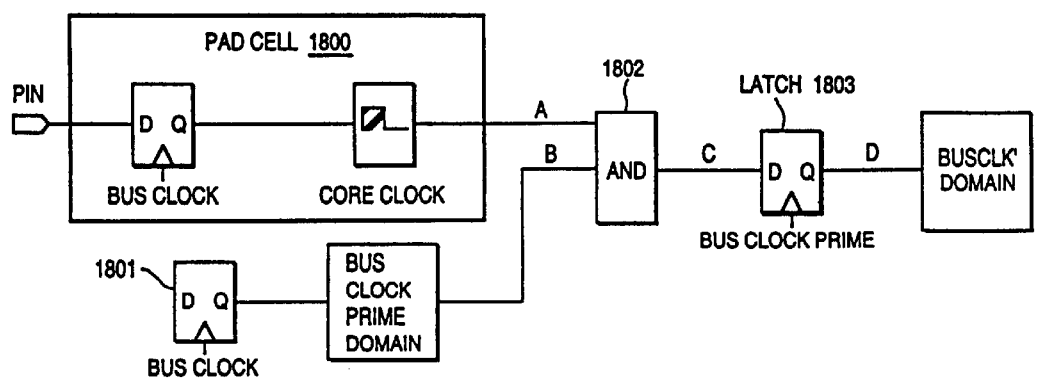
FIG__18B

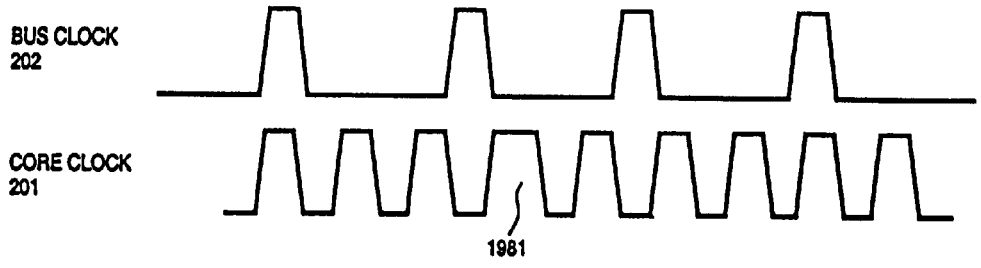
FIG_19
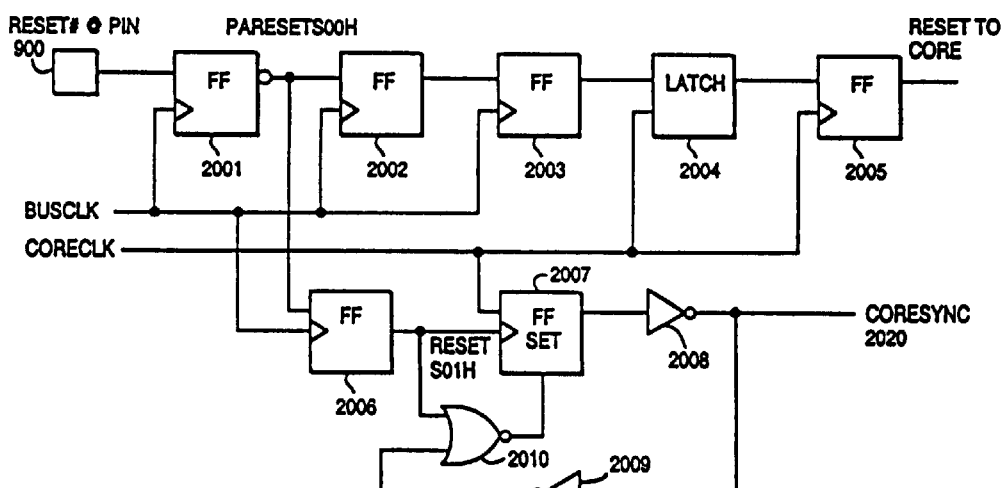
FIG_20
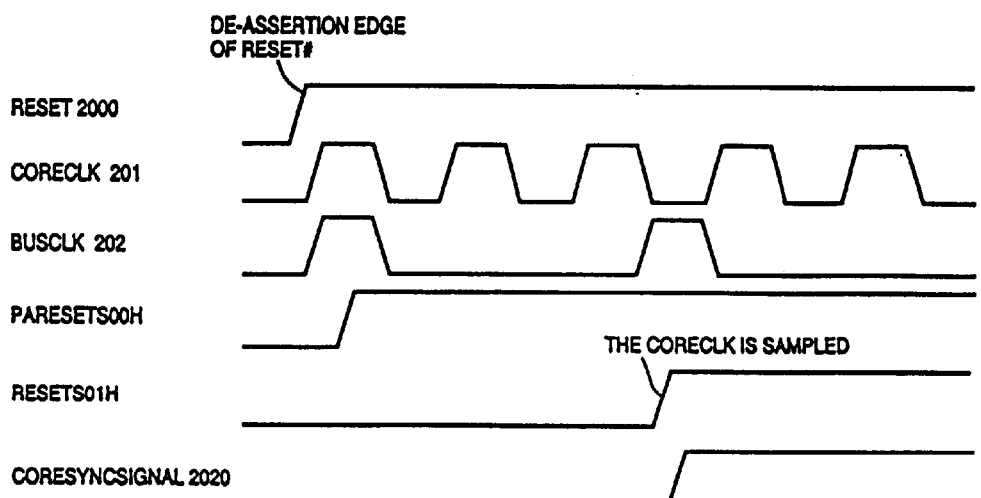
FIG_21

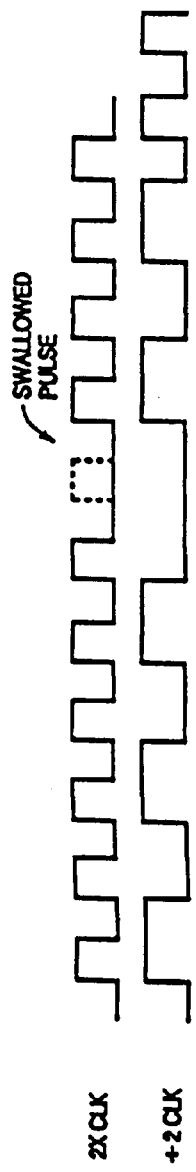
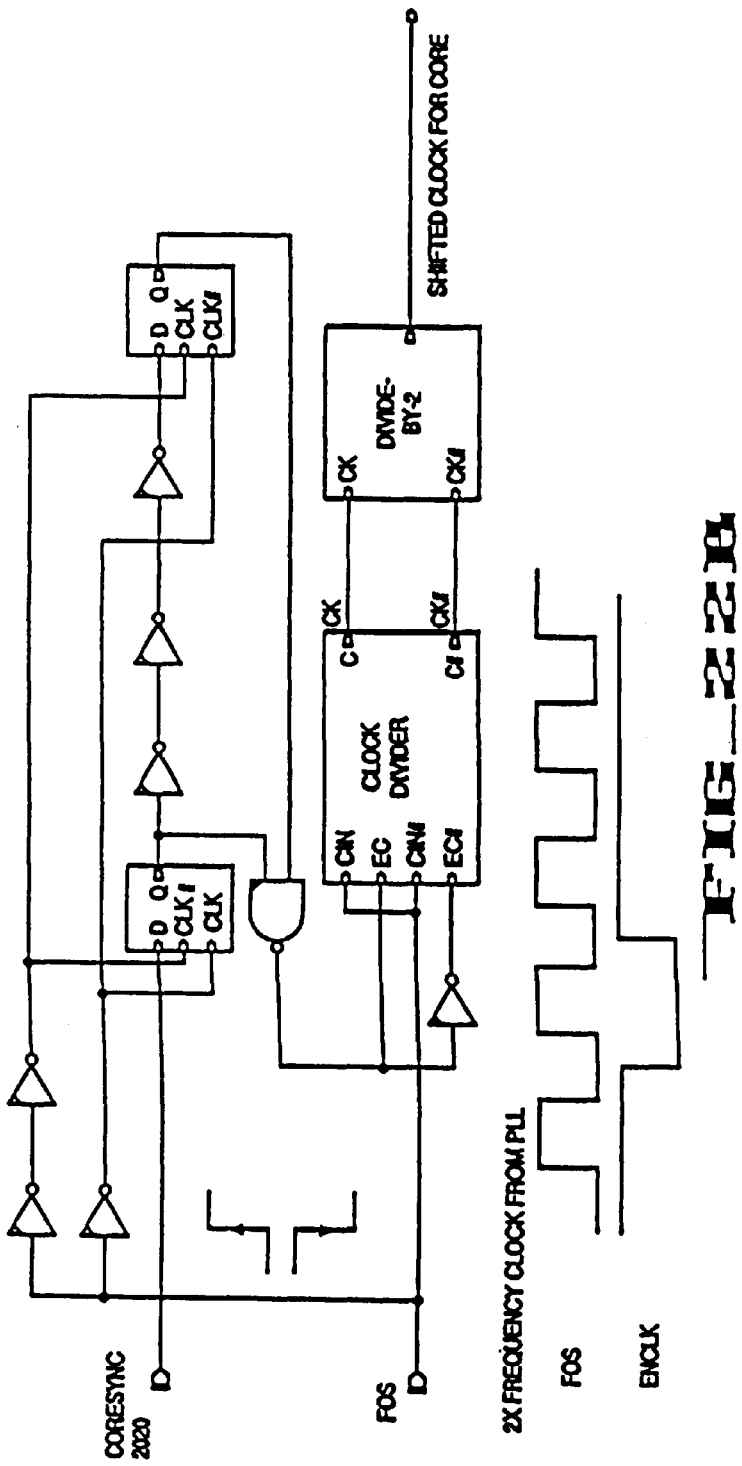

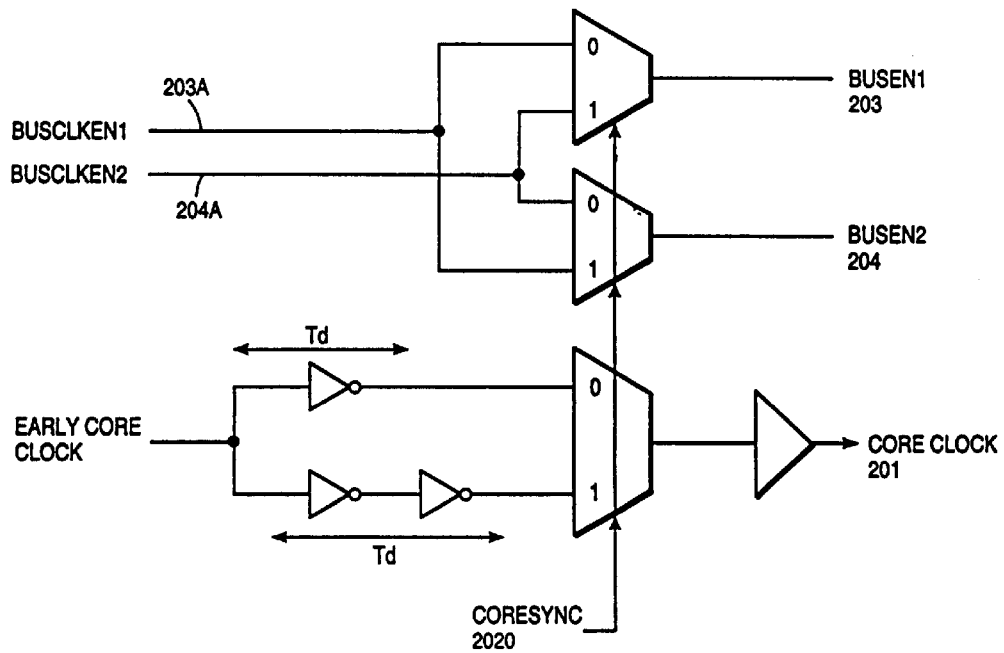
FIG_23
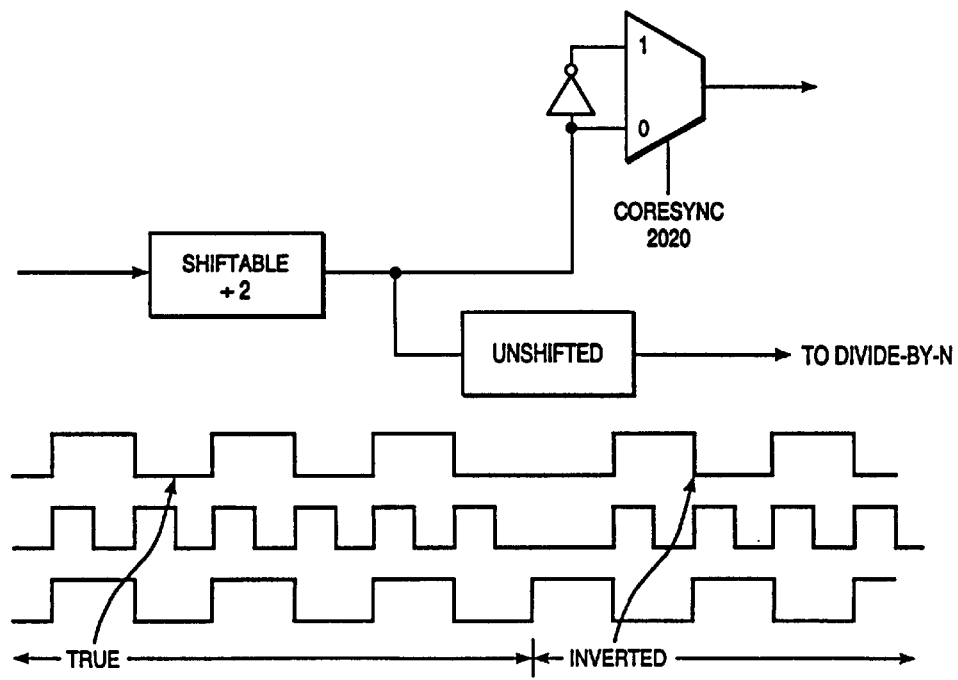
FIG_24

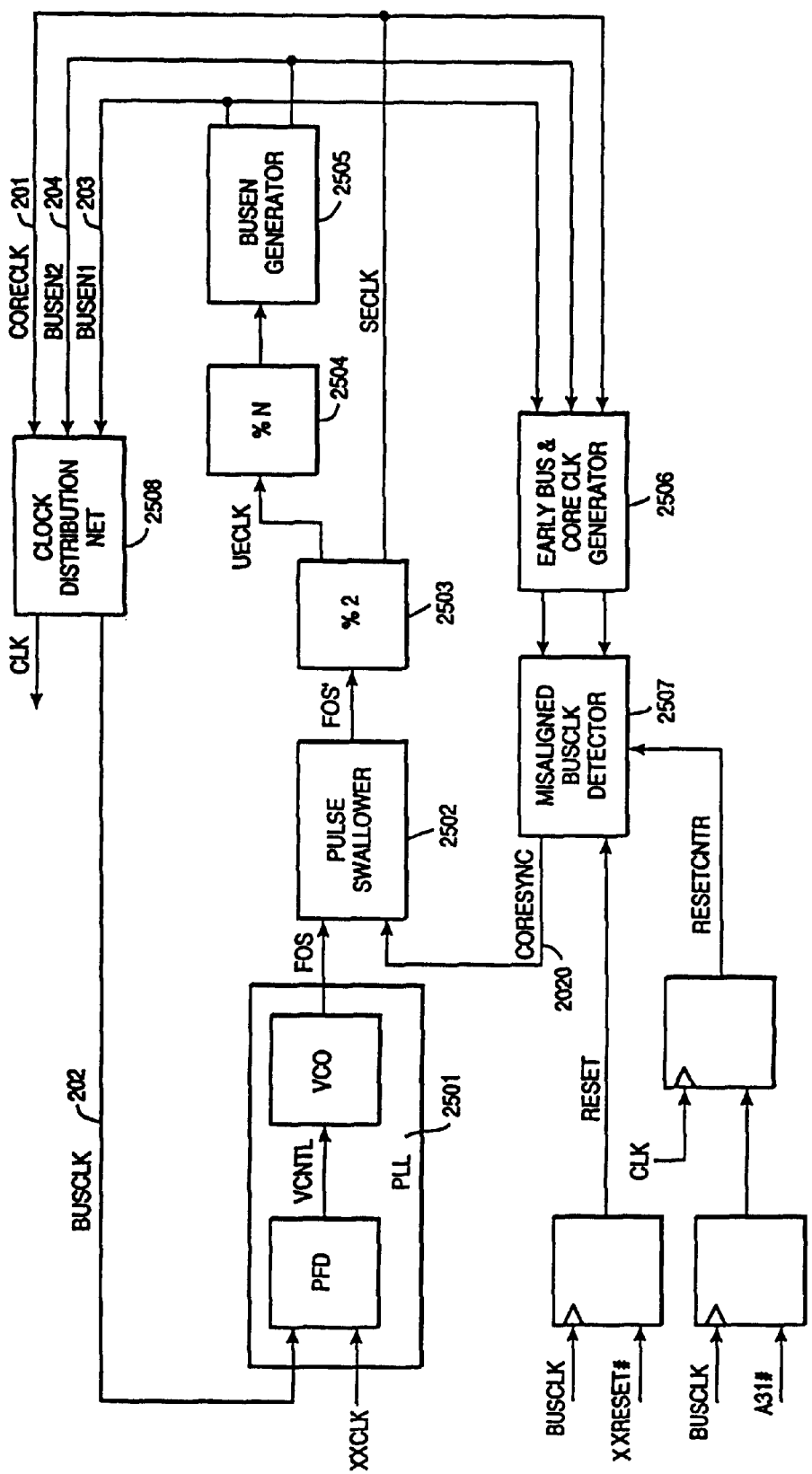
FIG_25

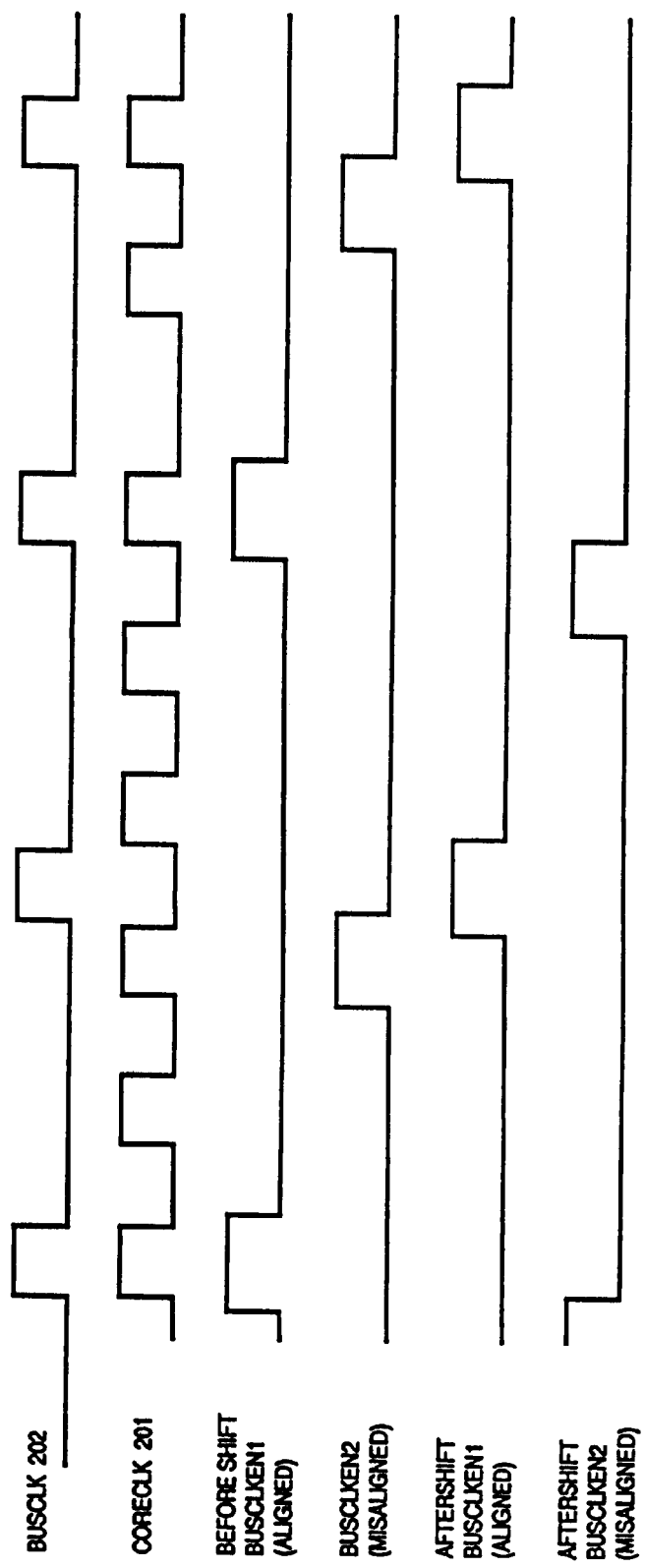

CORE CLOCK CORRECTION IN A 2/N MODE CLOCKING SCHEME

This application is a division of application Ser. No. 09/170,997, filed Oct. 13, 1998, which is a division of application Ser. No. 08/709,379, filed Aug. 30, 1996, which is a continuation-in-part of U.S. patent application Ser. No. 08/581,400, filed Dec. 29, 1995, now abandoned, entitled "Method and Apparatus for Generating 2/N Mode Bus Clock Signals."

FIELD OF THE INVENTION

The present invention relates to the field of clock generation; more particularly, the present invention relates to generating bus clock signals and core clock signals, such as those having a 2/N ratio relationship with respect to each other.

BACKGROUND OF THE INVENTION

Historically the system frequency of a computer was limited by the available silicon technology. In other words, system board technology was capable of higher frequency operation than that of microprocessors provided by then available silicon technology. Computer systems designed using older technologies commonly operated both the system board and the microprocessor at the lower frequency required by the microprocessor. However, because silicon technology has advanced more rapidly over time than system board technology, a crossover has occurred. Today, advanced silicon technology provides microprocessors that are capable of operating at much higher frequencies than currently available system boards.

Besides system board and microprocessor technologies, other situations exist where differing technology constraints may result in distinct frequency domains. For example, a microprocessor and a cache memory may be manufactured using different silicon technologies, each technology providing a different maximum frequency of operation. A microprocessor and a floating point unit may also be operated advantageously at different frequencies. In these examples, the cache memory and/or floating point unit may be either on the same chip (or die) as the CPU, or on a separate chip. Even when manufactured on the same chip, individual functional blocks that exchange data may be advantageously operated at a different frequencies. Other examples of devices that may be advantageously operated at different frequencies are discrete logic components and telecommunications devices.

Today, in order to provide high performance computer systems, it is advantageous to operate the microprocessor(s) at its highest possible frequency and other parts of the computer system at a lower frequency dictated by either system board technology or other technology constraints. Transferring data between various components that operate at different frequencies may be synchronous or asynchronous.

Synchronous designs in microprocessors are advantageous over asynchronous designs for several reasons. First, microprocessor design validation tools are optimized for debugging synchronous logic designs. Using synchronous design techniques makes microprocessor design and validation much easier and more reliable. Second, synchronous designs are mandated in fault tolerant computer systems that use a master-checker scheme. In a master-checker system a first processor, the master, operates lock-stepped with a second processor, the checker. During each clock cycle, the checker processor monitors whether the two processors produce identical results on their pins to provide error checking. Because asynchronous data transfer designs do not provide the requisite lock-stepped operation they are not acceptable in master-checker systems.

Some microprocessors operate internally at an integer multiple of the frequency of the computer system bus. In such a computer system, synchronous data transfer between components operating at different frequencies is facilitated by the fact that a data transfer edge of the lower frequency clock corresponds to a data transfer edge of the higher frequency clock. Therefore, the data transfer edge of the lower frequency clock (and/or corresponding data transfer edges of the higher frequency clock) can be used to cause data transfer. However, integer multiple frequency designs only take advantage of quantum-leap improvements in silicon technology. For example, if system board technology is limited to 50 MHz operation, then microprocessors operating at 100, 150, 200, . . . MHz can be used in an integer multiple design. Suppose that currently available silicon technology provides microprocessors capable of operating at 120 MHz. The additional 20% performance beyond 100 MHz is not utilized in an integer multiple design. It would be advantageous to provide a microprocessor design capable of operating at more flexible frequency ratios to the system bus while also providing synchronous data transfer between the microprocessor and other devices on the computer system bus. In general, it would be advantageous to provide synchronous data transfer between a variety of digital logic and memory devices that operate according to flexible operational frequency ratios. The present invention provides these advantageous results.

One prior art 1/N mode bus clock generation scheme supports 1/N ratio bus clock to core clock, where N is limited to being 2, 3, or 4. In 1/N mode clock scheme, a phase-locked loop (PLL) generates a core clock signal which is at N times higher frequency than the system clock received by the integrated circuit. A programmable ring counter generates an enable signal every Nth cycle which selects every Nth cycle of the core clock to generate the internal bus clock signal.

One advantage of such a scheme is that the core clock and bus clock share the same clock distribution network for many stages. This greatly reduces the possible skew between the core clock and the bus clock. In fact, the skew between the bus clock and the core clock is no worse than the intra-unit skew between core clocks. Thus, it is desirable to have a single clock distribution path for both the core clock and the bus clock, is particularly advantageous, allowing easy management of the skew between the two clocks.

At least one prior art microprocessor uses a phased locked loop (PLL) with some extra logic to generate a ⅔ mode clock. Although this uses the same PLL for bus clocks and core clocks, there is a separate clock distribution path for the two clocks.

Therefore, a system, method, and apparatus for synchronous data transmission between digital devices operating at frequencies having a 2/N integer ratio relationship is needed.

SUMMARY OF THE INVENTION

The present invention provides a clock generator fabricated on an integrated circuit is described. In one embodiment, the clock generator comprises a core clock generator configured to generate a core clock signal, a bus enable generation logic configured to generate first and second bus clock enable indications. A first circuitry is configured to generate a bus clock signal by selecting every N/2 cycles of the core clock signal in response to the first and second bus clock enable indications. In one embodiment, N is not an integer greater than 2. The clock generator also includes a detector that is configured to determine whether the core clock signal is out of phase with the bus clock signal and correction circuitry that places the core clock signal in phase with a bus clock signal if the detector determines that the core clock signal is out of phase with the bus clock signal.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a block diagram of the embodiment of an integrated circuit of the present invention.

FIG. 2 illustrates a set of 2/N mode clock enable signal waveforms.

FIG. 3 illustrates one embodiment of a circuit to generate a bus clock signal using two bus clock enable signals.

FIG. 4 illustrates one embodiment of the enable signal generation block of the present invention.

FIGS. 5A and 5B illustrate a scheme for separating two bus clock enable signals from a combined bus enable signal.

FIG. 6A is a waveform diagram illustrating the bus clock prime signal.

FIG. 7 is an exemplary circuit implementation for generating the bus clock signal.

FIG. 8A illustrates the use of the sample enable signal.

FIG. 8B illustrates the use of the drive enable signal.

FIG. 8C illustrates the use of the write data enable signal.

FIG. 9 illustrates the clock and synchronization signals for the ⅖ fractional speed bus.

FIG. 10 illustrates the pad cell input path between the core clock domain and the pins.

FIG. 11 illustrates the pad cell output path between the core clock domain and the pins.

FIG. 12 illustrates one embodiment of a pad cell implementation for the 2/N fractional bus.

FIG. 13 is a waveform diagram illustrating mindelay problems with the two core clock signals.

FIG. 14 illustrates one embodiment of a clock generation circuit for generating the core clock signals.

FIG. 15 illustrates output waveforms of the distribution network of FIG. 14.

FIG. 16 illustrates one embodiment of a circuit for handling 2/N glitch.

FIG. 17 is a timing diagram illustrating a glitch for the ⅖ fractional speed bus.

FIG. 18A illustrates an alternate embodiment for handling 2/N glitch.

FIG. 18B illustrates another embodiment for handling 2/N glitch.

FIG. 19 illustrates a waveform of a shifted pulse that occurs during correction.

FIG. 20 illustrates one embodiment of a detector logic diagram for a sync signal generator of the present invention.

FIG. 21 illustrates one embodiment of associated waveforms for a sync signal generator.

FIG. 22A illustrates an example of the 2x clock having one of its pulses swallowed.

FIG. 22B illustrates one embodiment of the circuitry and associated waveforms for shifting the core clock phase.

FIG. 23 illustrates pulse shifting circuitry using an early core clock signal.

FIG. 24 illustrates one embodiment of core signal correction logic of the present invention.

FIG. 25 is a block diagram of one embodiment of a 2/N clocking circuit of the present invention.

FIG. 26 is a timing diagram of the bus clock enable signals before and after a shift of the core clock signal.

DETAILED DESCRIPTION OF THE PRESENT INVENTION

Figure 6B:
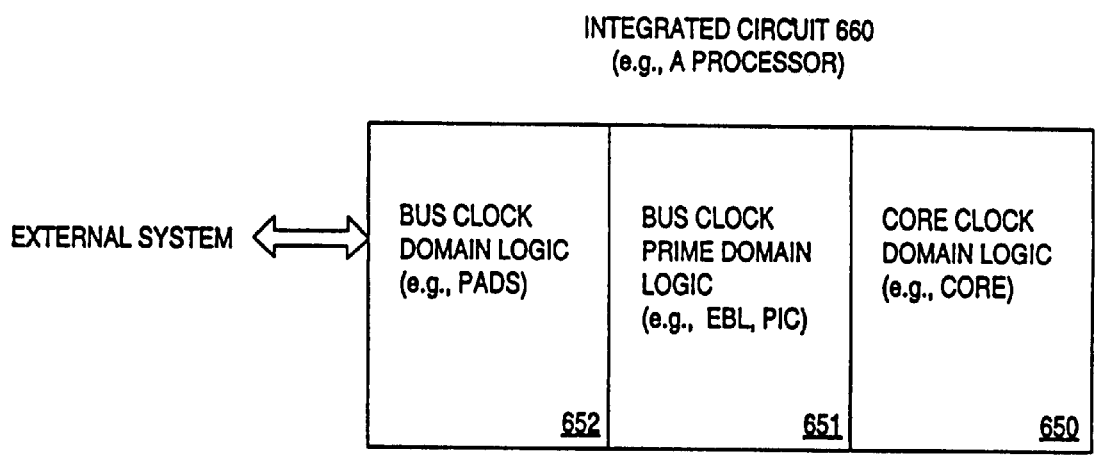
FIG. 6B illustrates one embodiment of an integrated circuit having a bus clock prime domain.

The method and apparatus for generating clock signals in an integrated circuit is described. In the following detailed description of the present invention, numerous specific details are set forth, such as specific signal names, device frequencies, bus frequencies, 2/N frequency ratios, etc., in order to provide a thorough understanding of the present invention. However, it will be apparent to one skilled in the art that the present invention may be practiced without these specific details. In other instances, well-known structures and devices are shown in block diagram form, rather than in detail, so as not to obscure the present invention.

It is understood that the present invention may be comprised of transistor circuits that are readily manufacturable using well-known CMOS (complementary metal-oxide semiconductor) technology, or other equivalent semiconductor manufacturing processes. In addition, the present invention may be implemented with other manufacturing processes for making digital devices.

While in the following discussion the present invention is presented with respect to implementation in a microprocessor, the present invention is not limited to that implementation. Implementations for generating clock signals for various digital devices such as discrete logic devices, memory devices, devices either on the same or separate chips, communications devices, etc., are within the scope and spirit of the present invention.

The 2/N Mode Clocking Scheme

The present invention provides for a 2/N mode clocking scheme. In such a scheme, for every N core clocks, there will be two bus clock cycles. Again, N may be any integer value, for example, 5, 7, and 9, to create such ratios as ⅖, 2/7, or 2/9, respectively, or for example, 4, 6, 8, etc., to create ratios, such as 2/4, 2/6 and 2/8, respectively. Specifically, in one embodiment, the core operates in conjunction with one or more core clock signals having a frequency of 200 MHz, while transfers with the bus occur using bus clock signals having a frequency of 66 MHz.

In one embodiment, the present invention provides a scheme for generating bus clock signals and core clock signals for an integrated circuit, where the bus and core clock signals have a 2/N ratio relationship with respect to each other, with N being an odd integer 3 or greater (e.g., 5, 7, 9, etc.). In other words, the frequency of core clock signal is N/2 times higher than the frequency of the bus clock signal. Note that N may be an even integer; however, in such a case, the core clock signal is an integral multiple of the bus clock signal. The present invention provides an enhancement over 1/N methodology, even where N in the present invention is an even integer value. In the present invention, the core clock signal refers to the clock that runs the internal portion of a device (e.g., processor), while the bus clock signal refers to the clock used for clocking bus operations, including transfers over a bus to and from the core.

FIG. 1 is a block diagram of one embodiment of an integrated circuit of the present invention. Referring to FIG. 1, the integrated circuit 100 is shown having a core 101, an interface 105, and a clock generator 102. The core 101 includes circuitry and logic to perform the designated functions of the integrated circuit, while the interface 105 provides an interface between the core 101 and the remainder of the system and its system bus(es). For instance, if the integrated circuit 100 comprises a processor, the core 101 may include one or more decoders, scheduling logic, execution units, reorder buffers, memory order buffers, register files, cache memory, etc., for use in executing instructions. The interface 105 may comprise external bus controller logic and programmable interrupt controller logic.

The clock generator 102 generates the clock signals in response to a system clock signal 110. In one embodiment, the clock generator 102 comprises a phase-locked loop (PLL). The clock signals are coupled to the core 101 and the interface 105. In one embodiment, the clock generator 102 generates the bus clock signal(s) 103 and the core clock signal(s) 104.

In one embodiment of the 2/N mode clock scheme of the present invention, the clock generator 102 generates the bus clock signal from the core clock signal using two bus clock enable signals, or other similarly functioning indications. These two bus clock enable signals are referred to herein as BusEn1 and BusEn2.

FIG. 2 illustrates a set of 2/N mode clock waveforms. Referring to FIG. 2, a core clock signal 201 and a bus clock signal 202 are shown. The bus clock signal 202 is generated by selecting cycles of the core clock signal 201 using the BusEn1 signal 203 and the BusEn2 signal 204. Thus, every Nth/2 cycle of the core clock signal 201 is selected to generate the bus clock signal 202. The BusEn1 signal 203 is used to select bus clock pulses which are in phase (i.e. aligned) with the core clock signal 201, while the BusEn2 204 selects bus clock pulses which are out of phase (i.e. misaligned) with the core clock signal 201.

As discussed below, in one embodiment, the present invention generates the bus clock enable signals using a programmable counter (e.g., a ring counter). Because both bus clock enable signals, the BusEn1 signal 203 and the BusEn2 signal 204, are generated by the same counter, they are always in synchronization with each other.

Note that in the case of N being an even integer, the 2/N mode is the same as a 1/N mode and only requires one of the two bus enables. In one embodiment, when 1/N mode is selected, the BusEn2 signal 204 remains low or is otherwise disabled.

FIG. 3 illustrates one embodiment of a circuit to generate the bus clock signal 202 using the BusEn1 signal 203 and the BusEn2 signal 204 in conjunction with an inverted version of the core clock signal 201. Referring to FIG. 3, the circuit comprises inverters 301–303 and NAND gates 304–306. Inverter 301 is coupled to receive the core clock signal 201 and inverts the core clock signal 201. The inverted core clock signal is coupled to one input of NAND gate 304. The other input of NAND gate 304 is coupled to the BusEn1 signal 203. The core clock signal 201 is also coupled to the input of inverter 302, which is coupled in series with inverter 303. The output of inverter 303 is coupled to one input of NAND gate 305, while the other input of NAND gate 305 is coupled to the BusEn2 signal 204.

Inverter 301 represents one inversion path, while inverters 302 and 303 together represent another. In the present invention, both inversion paths have the same delay. In other words, the delay on the core clock signal 201 caused by inverter 301 is the same as the delay caused by inverters 302 and 303 together (i.e., the delays are matched). The delays are the same to prevent jitter of the even and odd bus clock cycles relative to the system clock. Preventing jitter is important because the set up and hold time at the input/output (I/O) pins has to be increased by any delay difference and the jitter may cause PLL instability since the PLL tries to line up the edges of the bus clock signal to the edges of the system clock signal.

The outputs of NAND gates 304 and 305 are coupled to the inputs of NAND gate 306. The output of NAND gate 306 comprises the bus clock signal 202. In this manner, NAND gates 304–306 operate as output logic for the circuitry to generate the bus clock signal. It would be apparent to one skilled in the art that alternative logic gates or circuitry which performs the same functionality in response to the enable signals may be used.

Generation of the Enable Signals

In the present invention, the bus enable signals are generated by bus clock enable signal generation block in the processor. In one embodiment, the bus clock enable signal generation block supports ratios of 2/5, 2/7 and 2/9, as well as other ratios where N is even. In an alternative embodiment, other ratios such as 2/3 or greater than 2/9 may be supported.

FIG. 4 illustrates one embodiment of the enable signal generation block of the present invention. Referring to FIG. 4, a 3-bit latch 401 is coupled to receive the N value. In one embodiment, the N value is received from a pin. In an alternate embodiment, the N value may be received from a register (hardwired or programmed), a bond option, etc. Latch 401 is clocked by an active low (#) reset signal 406, such that whenever reset signal 406 is asserted, the value of N is latched into latch 401. In one embodiment, the reset signal 406 is asserted by another device in the system.

Latch 401 is coupled to a 3-to-8 decoder 403 and a fractional mode enable logic block 402. The fractional mode enable logic 402 latches in the value from 3-bit latch 401 in response to clock signal 407. The fractional mode enable logic block 402 determines if 2/5, 2/7 or 2/9 mode is selected and, if so, appropriately asserts a signal 410 to enable the BusEn2 signal 204. If the fractional mode enable logic block 402 determines that a 1/N mode has been selected, then the signal 410 is not asserted, thereby causing the BusEn2 signal 204 to be held low.

The 3-to-8 decoder 403 decodes the latched-in N value and supplies the decoded signals to a 9-bit ring counter 404. In another embodiment, an incrementer, state machine counter, shift register, etc., may be used to provide similar functionality to control the bus enable generational logic. Ring counter 404 strobes the bus enable output logic 405, causing the bus enable output logic 405 to output the BusEn1 signal 203 and the BusEn2 signal 204 with the appropriate timing.

In one embodiment, the bus enable output logic 405 may be implemented in a manner similar to FIG. 5B described below. Also, if a 1/N mode is selected, such bus enable output logic 405 may be simplified to only output a single enable signal.

In one embodiment, decoder 403 and ring counter 404 support the bus to core clock ratios shown in Table 1:

TABLE 1

Bus to Core Clock Ratio Selection

| N Value | Ratio |
|---|---|
| 000 | 1/2 |
| 001 | 1/3 |
| 010 | 1/4 |
| 011 | 1/2 |
| 100 | 1/2 |
| 101 | 2/7 |
| 110 | 2/9 |
| 111 | 2/5 |

In one embodiment, a single composite bus clock enable signal representing a logical OR of the two bus enable signals 203 and 204 may be used. This composite bus clock enable signal may be ANDed with the core clock signal to produce a bus clock signal. Use of the composite bus clock enable signal reduces the routing overhead on the processor; however, it does not eliminate the space required for decoding the composite bus clock enable signal.

FIGS. 5A and 5B Illustrate a scheme for separating two bus clock enable signals from a composite bus clock enable signal. Referring to FIG. 5A, waveforms of the system clock signal 110, the composite bus clock enable signal 511 and the select signal 510 are shown. The select signal 510 indicates which bus clock enable signal, BusEn1 or BusEn2, is being pulsed.

Referring to FIG. 5B, the bus enable generation circuitry comprises a flip-flop clocked by the bus clock enable signal 511. The data input of flip-flop 501 is coupled to an inverted version of the core clock signal 201. On each pulse of the composite bus clock enable signal 511, a clock cycle is output as a select signal 510 to an input of NAND gate 502. The other input to NAND gate 502 is coupled to the bus clock enable signal 511. The select signal 510 is also coupled to one input of NOR gate 505. The other input to NOR gate 505 is coupled to the output of inverter 504, which is coupled to receive the composite bus clock enable signal 511. The output of NAND gate 502 is coupled to an input of inverter 503. The outputs of inverter 503 and NOR gate 505 are the BusEn1 signal 203 and BusEn2 signal 204, respectively. The operation of the bus enable generation circuitry of FIG. 5B would be within the understanding of those skilled in the art.

In 2/N mode, the falling edge of the composite bus dock enable signal 511 samples the high and low phase of the system clock signal 110 alternately. This sampling causes the select signal 510 to toggle every falling edge of composite bus clock enable signal 511. The select signal 510 is then used to transfer alternate pulses of the bus clock enable signals BusEn1 and BusEn2 as outputs.

Thus, the present invention provides a simple scheme that does not need two phase lock loops (PLLs) to generate bus clock signals for a 2/N mode. In the prior art, two PLLs were required to generate a 2/N clocking scheme. However, it is difficult to keep two PLLs synchronized. In the present invention, because the two bus clock enable signals are generated from the same counter, they are synchronized. Therefore, the present invention is advantageous in that only one PLL is used and no complex mechanism or circuitry is required to maintain synchronization. Moreover, the present invention provides the bus clock and core clock signals using a single distribution path. This prevents a large skew from being created between the bus and core clock signals that is attributed to separate distribution paths as is in the prior art. In an alternative embodiment, separate distribution paths may be used to generate the core and bus clock signals.

Bus Clock Prime

In one embodiment, in order to simplify the external bus logic (EBL) for interfacing the core of the device to the system and the programmable interrupt controller (PIC) for controlling response by the device to received interrupts, the bus clock enable signals are slightly modified. In alternative embodiments, other interface units and circuitry of integrated circuits such as a processor may also be clocked with bus clock signals that are slightly modified. In this case, instead of clocking the EBL and the PIC with bus clock signal 202, a modified version of bus clock signal 202, referred to herein as the bus clock prime signal, is used.

The bus clock prime signal is always aligned with the core clock signal. The bus clock prime signal has the same high pulse as bus clock signal 202 when the bus and core clock signals are in phase, but every other high pulse of the bus clock prime signal is a core clock phase earlier than the bus clock pulses of bus clock signal 202 that are out of phase with the core clock signal 201. In other words, the pulse of the bus clock signal 202 that corresponds to the low phase of the core clock signal 201 is advanced by a phase so that it now comes on the high phase of the core clock. In the ⅔ fractional bus mode, there is a difference of two cycles and three cycles between pulses, repeating in a 2, 3, 2, 3, etc. fashion, instead of a pulse of the bus clock signal 202 occurring every 2.5 core clock pulses. FIG. 6A is a waveform diagram illustrating the bus clock prime signal 601. Also shown in FIG. 6A is a bus clock prime enable signal 602 which is used to select pulses of the core clock signal 201 for the bus clock prime signal 601.

Using the bus clock prime signal of the present invention allows much of external bus logic which acts to interfere the core to the system bus to operate according to 1/N. In other words, using the bus clock prime signal, the present invention allows 1/N logic to be enabled to support 2/N mode. Because the 1/N logic may be used, existing 1/N clock distribution schemes may be used, with slight modification as described below.

FIG. 6B illustrates an integrated circuit according to the teachings of the present invention. Integrated circuit 660 includes a core clock domain logic 650 which is clocked by the core clock signal. In one embodiment, the core clock domain includes the core of a processor or other integrated circuit device. The integrated circuit 660 also includes a bus clock domain logic 652 which is clocked by the bus clock signal. In one embodiment, the bus clock domain logic 652 includes pads in the pad ring that interface the integrated circuit 660 to the external system. Interfacing the bus clock domain logic 652 to the core clock domain logic is the bus clock prime domain logic 651. In one embodiment, as described above, the bus clock domain logic may comprise the EBL and the PIC, as well as other elements. The bus clock prime domain logic 651 is implemented in 1/N logic, supporting the 2/N mode logic with 1/N logic.

The bus clock prime signal is used to facilitate the transfer of data to and from the core clock domain. When the core of the processor is interacting with the external system, it may be inputting or outputting data. When data is within the core, either before being sent or after being received, the core operates on the data in the core clock domain. Without using the bus clock prime signal, the present invention must provide circuitry to handle data transfers in both the low and high phases of the core clock signal. However, using the bus clock signal to control the pads of signals to and from the core, data transfers occur on the same phase (e.g., high phase) and the extra circuitry to accommodate transfers on both phases is not necessary. Note that in an alternate embodiment of the present invention, data could be transferred on the low phase of the bus clock signal.

In one embodiment, the bus clock enable signals 203 and 204 are generated to select pulses of the system clock to create the bus clock prime signal 601, and not the bus clock signal 202. In such a case, the bus clock signal 202 may be obtained by delaying one of the bus clock enables for the bus clock prime signal 601, thereby generating the appropriate enable for use in creating bus clock signal 202. That is, in one embodiment, enables are generated to create the bus clock prime signal 601 and one of the enables is modified so that it correctly generates the bus clock signal 202.

FIG. 7 is an exemplary circuit implementation for generating the bus clock signal 202 as mentioned above. Referring to FIG. 7, a circuit is shown receiving the BusEn1 signal 203, the BusEn2 signal 204, and an inverted version of the core clock signal. The BusEn2 signal 204 is a phase early since it is used for selecting a pulse for the bus clock prime signal 601. To generate the bus clock, a latch 701 is used to latch the BusEn2 signal 204, thereby delaying the BusEn2 signal 204 by a phase. Note that in this implementation, NAND gates are no longer used in favor of pass gates. Those skilled in the art would be familiar with the operation of such a circuit.

Information Transfer

To transfer information between clock domains (e.g., from the core clock domain to the bus clock domain the present invention uses a series of enable signals and a state machine. These enable signals operate as synchronization signals for transfers. In one embodiment, these signals are referred to as write data enable, drive enable and sample enable. In one embodiment, the enable signals are generated using a state machine in the EBL that counts the number of core clocks until the next bus clock based on the bus clock ratio and reset.

The sample enable signal is used to transfer information from the bus clock domain to the core clock domain. FIG. 8A illustrates the use of the sample enable signal. Referring to FIG. 8A, information is transferred from the bus clock domain, through a pad cell 811, and then to AND gate 801. The AND gate 801 is also coupled to receive the sample enable signal 810. When the sample enable signal 810 is high, the information at AND gate 801 is output to the core clock domain. In alternate embodiments, AND gate 801 may comprise a driver, an enable flip-flop, or any other device with the described functionality.

The write data enable and the drive enable signals are used to transfer information (data and signal information respectively) from the core clock domain. The write data enable is for write cycles when data is fetched from the data cache many coupled to the processor from a backside (dedicated) bus. The drive enable is a latched version of the write data enable used to transfer data from the core clock domain to the bus clock. FIG. 8B illustrates the use of the drive enable signal. Referring to FIG. 8B, information is transferred from the core clock domain to AND gate 802. The AND gate 802 is also coupled to receive the drive enable signal 820. When the drive enable signal 820 is high, the information at AND gate 802 is output through a pad cell 821 to the bus clock domain. In alternate embodiments, AND gate 802 may comprise a driver, an enable flip-flop, or any other device with the described functionality.

Similarly, FIG. 8C illustrates the use of the write data enable signal. Referring to FIG. 8C, information is transferred from the core clock domain to AND gate 803. The AND gate 803 is also coupled to receive the write data enable signal 830. When the write data enable signal 830 is high, the information at AND gate 803 is output through a latch clocked by the core clock signal, which outputs to a pad cell 831 and then to the bus clock domain. In alternate embodiments, AND gate 803 may comprise a driver, an enable flip-flop, or any other device with the described functionality.

It should be noted that one skilled in the art would be able to generate such signals. Note that in FIGS. 8B and 8C, the AND gates are not required. All that is required is that information being transferred from the core clock domain is sychronized with the corresponding enable signal (e.g., each transferred signal is generated in the same clock as the enable signal).

FIG. 9 illustrates the clock and synchronization signals for the ⅖ fractional speed bus. Referring to FIG. 9, the system clock signal 110, the bus clock signal 202 and the core clock signal 201 are shown. Also shown in FIG. 9 is the bus clock prime enable signal 602 for the bus clock prime signal 601. The bus clock prime signal 601 is generated by ANDing the core clock signal 201 with the bus clock enable signal 602. While in the ⅖ fractional bus core, the bus clock prime signal 601 alternates between ½ and ⅓ clock ratios, in the 2/7 fractional bus case, it alternates between ⅓ and ¼ clock ratios.

The enables signals are shown. In one embodiment, these signals are derived from the edge of the reset signal. The drive enable signal 820 is the delayed version of the write data enable signal 830. In the ⅖ fractional bus case, drive enable signal 820 is active at state 3, one and a half clock cycles before the misaligned bus clock signal 202 (one clock before aligned). The sample enable signal 810 is active at state 1, one half clock after the misaligned bus clock signal 202 (same clock during aligned). It should be noted that the sample enable signal 810 is not a latched version of the drive enable signal 820. In fact, the sample enable signal 810 is either delayed from the drive enable signal 820 by one or two clock cycles on alternating cycles. Thus, in the ⅖ fractional bus case, the sample enable signal 810 is asserted for a clock, deasserted for two clocks, asserted for a clock, deasserted for a clock, asserted for a clock, etc. A state machine uses a counter to count for every clock to identify the current state. The states 913 of the state machine are shown.

Note that the sample enable signal 810, as well as the other enable signals, may be derived from one signal. In one embodiment, a series of flip-flops are coupled, with the output of each being the input to the next flip-flop. The write data enable signal is 830 is input to the first flip-flop. The output of the first flip-flop is the drive enable signal 820. The drive enable signal 820 is input into a second flip-flop. The output of the second flip-flop is one version of the sample enable signal 810 which is only one delay from the drive enable signal 820 (aligned with the bus clock signal). This version of the sample enable signal is also input into a third flip-flop, the output of which is the sample enable signal 810 with a two cycle delay from the drive enable signal 820 (misaligned with the bus clock signal). A multiplexor (mux) may then be used as a switch to select the correct sample enable signal based on whether the current bus clock signal is aligned or misaligned to the core clock. A signal from the state machine may be used to select the correct one of the sample enable signals as an output of the mux. In one embodiment, the determination of which to select first is based on whether the bus clock signal is aligned or misaligned with the core clock signal. An indication of which bus clock is misaligned is available is described below. Such a signal may be generated using a state machine synched at reset. Thus, the sample enable signal 810 flips back and forth during aligned/misaligned periods.

An early system enable signal 912 and its enable 911 are also shown. In one embodiment, the early sample enable signal 912 is used by functional units to latch and generate a local sample enable. The enable 911 to create the early sample enable is used by the functional unit to generate the local sample enable signal 912. The use of the early sample compensates for timing requirements (e.g., signal fanouts).

Pads

FIGS. 10 and 11 illustrate the pad cell input path and output path respectively between the core clock domain and the pins. Referring to FIG. 10, the pad cell input path 1000 comprises a series of latches. The pad cell comprises a pulsed latch 1001 coupled to receive input information from the pin. The output of this pulsed latch 1001 is coupled to the input of a latch 1002. The output of latch 1002 is coupled to the core clock domain. In an alternative embodiment, the pulsed latch 1001 could be a D flip-flop.

The pulsed latch 1001 is clocked by an early version of the bus clock signal 202 (output signal from inverter 700 of FIG. 7), while the latch 1102 is clocked by the core clock signal 201. In another embodiment, the pulsed latch 1001 may be replaced by a flip-flop clocked by the bus clock signal 202.

At the occurrence of a pulse of the bus clock signal 202, the pulsed latch 1001 latches the information on the pin. If this rising edge of the bus clock signal 202 does not coincide with a rising edge of the core clock signal 201, the data in the pulsed latch 1001 is sent to the core clock domain on the next high pulse of the core clock signal 201. When the bus clock signal 202 and core clock signal 201 are misaligned (rising edges do not coincide), the latch 1002 acts to delay the transfer of information to the core for one half of a core clock cycle, in order to transfer this information from the bus clock time domain to the core clock time domain.

Referring to FIG. 11, the cell output path of the present invention comprises a pad cell 1100 coupled between the core clock domain and the pin. The pad cell 1100 comprises a latch 1102 clocked by the core clock signal 201 that receives information from the core clock domain. The output of latch 1102 is coupled to the input of a master-slave flip-flop 1101 (e.g., D flip-flop), which is clocked by the bus clock signal 202. The output of the flip-flop 1101 is coupled to the pin.

When information is being transferred from the core clock domain, the latch 1102 latches the information at the occurrence of a high phase of the core clock signal 201. If this rising edge of the core clock signal 201 does not coincide with a rising edge of the bus clock signal 202, the data in the latch 1102 is latched into flip-flop 1101 and is output to the pin at the next occurrence of the bus clock signal 202. When the bus clock signal 202 and core clock signal 201 are misaligned (rising edges do not coincide), the latch 1102 acts to hold the data from the core for one half of a core clock cycle, in order to transfer this information from the core clock time domain to bus clock time domain.

In both the input and output paths, the extra latch clocked by the core clock signal 201 is necessary because of the misaligned core clock signal 201 and bus clock signal 202. The data is held in the latch for one half of the core clock cycle in order to transfer it to the appropriate clock domain.

FIG. 12 illustrates one embodiment of pad cell implementation for the 2/N fractional bus. Referring to FIG. 12, NAND gate 1201 is coupled to receive the signal going out from the core to the pad (which is connected to the pin), referred to in FIG. 12 as the coresigout signal 1250, and a drive-to-pin enable signal, referred to in FIG. 12 as the DRV2PIN signal 1251. The output of NAND gate 1201 is coupled to the input of a master-slave flip-flop comprised of pass gates 1202 and 1205, inverters 1203, 1206, 1207, 1208, 1209, tristate buffer 1204 and NOR gate 1210. The master in this master-slave flip-flop can be closed either on the rising edge of the core clock signal or the rising edge of the bus clock signal. This is accomplished through the use of NOR gate 1210. The slave in this flip-flop is controlled by the bus clock signal. The operation of this flip-flop would be apparent to those skilled in the art. The output of the flip-flop is coupled to the input of inverter 1211, the output of inverter 1211 is coupled to the input of output driver 1212 (implemented in one embodiment as a transistor), whose output is coupled to the pin. The pin is tied to a termination voltage through a termination resistor 1213. The operation of this implementation would be well known to those skilled in the art.

The input path of the pad cell is shown in the lower half of FIG. 12. An input signal is coupled to the sense amplifier 1216. In an alternative embodiment, the sense amplifier 1216 may be a buffer. The output of the sense amplifier 1216 is coupled to the d input of the pulsed latch 1217 which is clocked by the early bus clock signal 110A. The early bus clock signal 110A is used to generate a pulse for the pulsed latch 1217 such that the timing matches that of a flip-flop clocked by the bus clock signal. In an alternative embodiment, the pulsed latch 1217 may be a flip-flop clocked by the bus clock signal.

The output of the pulsed latch 1217 is coupled to the input of a latch comprised of pass gate 1218, inverters, 1219, 1221, 1222, 1223 and tristate inverter 1220. This latched is clocked by the core clock signal. The output of this latch is the signal into the core, referred to as sigin2core signal 1252.

In one embodiment, the core clock signal used to clock the core interface latches is replaced by the signals coreinclk 1221 and coreoutclk 1260. There are specially designed signals to eliminate mindelay problems in the input and output paths.

With the addition of the latches to the core interface, a mindelay concern arises. The conditions occur when the core clock signal 201 and the bus clock signal 202 are out of phase (rising edges misaligned). These conditions are shown in FIG. 13. For the path from core to pin, there is a concern that the latch driven on the coreoutclk signal will open too soon and change the data on the output (condition 1 in FIG. 13). This transition from the coreoutclk signal must be either delayed or masked all together. For the path from the pin to the core, the concern is that the latch driven on the coreinclk signal will close too late and the data input to the core will change 1-half a core cycle too soon (condition 2). To avoid this condition, the transition that closes the latch must occur sooner, or the opening of the latch for that phase be masked all together. Note that when the core clock signal 201 and bus clock signal 202 are aligned, the latches in the core clock domain need not be clocked and may be held open.

Referring to FIG. 13, an inverted core clock signal 201 is shown with bus clock enable signals 203 and 204 that are used to generate the bus clock prime signal 602. Also shown is an enable signal 1300 based on bus enable signal 204 to enable the out of phase of the bus clock signal 202. Also demonstrated are the mindelay concerns outlined in the previous paragraph (conditions 1 and 2). FIG. 13 shows the requirements for this signals to avoid mindelay problems. FIG. 15 illustrates the actual signals being used, including the coreinclk signal 1261 and coreoutclk signal 1260 used to solve the mindelay problems in one embodiment of a 2/N pad cell. These signals only transition when needed; they do not toggle every core clock cycle.

FIG. 14 shows a circuit that may be used to generate the early bus clock signal 110a, the bus clock signal 202, the coreinclk signal 1261, the coreoutclk signal 1260, and the core clock signal 201. The operation of this clock generation circuit would be well known to those skilled in the art, and will not be described in detail. The output waveforms generated by this circuit are shown in FIG. 15. Referring to FIG. 15, the rising edges of the coreinclk signal 1261 and coreoutclk signal 1260 match core clock signal timing. The timing of the falling edges for these signals is not critical. As shown in FIG. 15, the latch into the core is held open when the coreinclk signal 1261 is high, and the latch from the core to the pad is held open when the coreoutclk signal 1260 is low.

It should be noted that during 1/N modes (coreclk and busclk rising edges are always aligned), clocking of the 2/N interface latches are not necessary. In one embodiment, these latches are held open (not clocked) during 1/N modes.

Logic Glitch

Due to the use of clocking signals of various domains, such as the core clock signal 201, the bus clock signal 202 and the bus clock prime signal 601, in conjunction of combinatorial logic, glitches sometimes occur. Specifically, the signals from three clock domains can qualify each other and cross over to the other domains if needed. For instance, the signals between the bus clock prime domain and the core clock domain may cross over easily because the core clock signal 201 and the bus clock prime signal 601 are always aligned. With respect to signals between the core clock domain and the bus clock domain, the pad cells described above operate to accommodate cases in which the core clock signal 201 and the bus clock signal 202 are aligned or misaligned. Signals transferred between the bus clock prime and the bus clock domains also do not have timing issues with respect to them because the core clock latch opening at the clock low state accommodates signals going from the bus clock prime domain to the bus clock domain and because the bus clock domain signals degenerate into the bus clock prime domain signal when going from the bus clock domain to the bus clock prime domain.

A glitch may occur due to the overlap between the bus clock signal 202 and the bus clock prime signal 601 in a misaligned clock. In other words, glitches occur when the bus clock prime information is qualified with bus clock information and the result is passed to the core clock domain without a synchronization signal (sample enable) and there is a misaligned core clock. To fix the glitch, an aligned clock signal, alignclksnn, is generated to mask out the glitch. In one embodiment, the alignclksnn signal is generated by a state machine. This signal is deasserted during misaligned clocks. Thus, the alignclksnn signal indicates when there are misaligned core clock edges between the bus clock signal 202 and the bus clock prime signal 601.

FIG. 16 illustrates one embodiment of the use of the aligned clock signal. Referring to FIG. 16, a pad is coupled to a pad cell 1601 including the two latches 1601A and 1601B as described above. A signal (A) is output from latch 1601B of the pad cell 1601 to one input of an AND gate 1603. The other inputs of AND gate 1603 are coupled to the bus clock prime domain signal (B) from latch 1600 and the alignclksnn signal 1602. The output (C) of AND gate 1603 is coupled to the input of latch 1604, which is clocked by the core clock signal 201. The output (D) of latch 1604 is a signal to the core clock domain. The alignclksnn signal 1602 is used to qualify the result of ANDing signals A and B. A timing diagram illustrating a glitch and the occurrence of the alignclksnn signal 1602 is shown in FIG. 17 for the ⅔ fractional speed bus. By deasserting the alignclksnn signal, during core clocks that are misaligned with the rising bus clock edge, as shown in FIG. 17, compensation for the glitch may be made.

In an alternate embodiments, the alignclksnn signal 1602 is not necessary in a situation such as that shown in FIG. 18A in which signal D is qualified by the drive enable signal 820 before it is propagated to the core clock domain. Referring to FIG. 18A, signals A and B output from the pad cell 1800 and the latch 1801 are coupled to inputs of AND gate 1802. Latch 1801 is clocked by the bus clock prime signal 601. The output (C) of AND gate 1802 is coupled to one input of AND gate 1806, with the other input being coupled to the sample enable signal 810. In this case, a glitch at state 2 will not be propagated to signal D (the output of AND gate 1806) since the sample enable signal 810 is not asserted at state 2.

FIG. 18B illustrates another embodiment in which signal C, which is output from AND gate 1802, is latch by latch 1803 which is clock by bus clock prime signal 601. In this case, a glitch at state 2 will not be propagated at signal D (the output of latch 1803) since the next rising edge of the bus clock prime signal 601 is at state 4 at which time the glitch is already gone.

Synchronization of Core Clock in 2/N Mode

Synchronization of the core clock signal may be required in the 2/N mode. Synchronization is required in FRC (Functional Redundancy Checking) mode where master and checker processors can power up with core clock signals out of phase. If the master and slave clocks are 180° out of phase in 2/N mode, an FRC error may result. That is, the two processors with opposite core clock phases will output the same data during different bus clock cycles, thereby resulting in FRC errors. Furthermore, synchronization may be required in the testing environment. For instance, during silicon debugging, it is essential that the core clock signal and the bus clock signal be in a predetermined phase relationship to make tests reproducible every time. Particularly, it is desirable to have the core clock signal and bus clock signal to be in a predetermined phase at the time reset is deasserted. Although a reset event is used, any synchronization point may be used to identify when the bus and core clock signals are in phase. Because of these reasons, the core clock signal is synchronized to the bus clock in the 2/N mode. Note that synchronization is not needed in a 1/N mode since the bus clock signal and core clock signals are always in phase.

In the present invention, synchronization is performed with respect to the deassertion of the external reset signal. When reset is being deasserted, the phase relationship between the bus clock signal and the core clock signal is examined. If both are not in the high phase, the phase of the core clock signal is corrected to match that of the bus clock signal. Thus, the phase of the core clock signal is checked the time the reset is deasserted. If the core clock signal is in the low phase, then the core clock signal and bus clock signal are assumed to be in opposite phases. In this case, the core clock signal must be corrected to synchronize these clock signals. If the core clock signal is in the high phase, no action needs to be taken on the core clock signal to correct its clock phase. Note that in the present invention, correction is applied to the core clock signal only.

In an FRC mode, if the core clock signals of both processors are subjected to such correction, then the two processors will be synchronized once correction has completed. It is assumed that the system bus clock signal is shared by both processors in this mode. In FRC mode, both processors must come up in the same state and at the same time after reset. In the 2/N clocking scheme of the present invention, when coming out of reset, there is no guarantee that the PLLs of both processors will be in sync such that the rising edges of their core clock signals are aligned with the system clock. The present invention provides for performing a set of events at a predetermined time after reset in order to synchronize the two PLLs. In the present invention, reset is held so that the processors have time to correct their clocks. Once this occurs, they will be properly synchronized out of reset.

Core Clock Correction

In one embodiment, the correction of the core clock signal is performed by shifting the core clock signal by one phase. Note that it is vital that the bus clock signal does not move or glitch because of the core clock correction. Otherwise, the PLL will go out of lock. Such a shifted pulse is shown in FIG. 19 where pulse 1981 is shown shifted to enable a correction. It should be noted that the shifting of the core clock signal (i.e., the correction) is performed after the system has released reset but prior to the time the processor leaves reset. Because the processor is still in reset, the remainder of the processor does not see the pulse extension to the core clock signal and, thus, does not do anything incorrect based on the extended clock pulse.

FIGS. 20 and 21 illustrate one embodiment of detector logic and associated waveforms, respectively, for a sync signal generator. The detector logic determines whether the phases of the bus and core clock signals are matching or not. Referring to FIG. 20, the detector logic 2000 comprises flip-flops 2001–2003, 2005–2007, inverters 2008 and 2009, latch 2004 and NOR gate 2010. Flip-flop 2001 is an inverting flip-flop. Flip-flops 2001–2003, latch 2004, and flip-flop 2005 are coupled in series, with the data output of one being coupled to the data input of the other, to generate the reset signal to the processor core. The data input of flip-flop 2001, the first in the series, is coupled to receive an active low reset signal from a pin. The output of flip-flop 2001 is the PaResetS00H signal and is fed to the inputs of flip-flops 2002 and 2006. Flip-flop 2005 generates the reset signal to the core of the processor. Flip-flops 2001–2003 are docked by the bus clock signal, while latch 2004 and flip-flop 2005 are clocked by the core clock signal. Latch 2004 removes the phase path to the core because the signal is being transferred from a slow clock domain (the bus clock domain) to a fast clock domain (the core clock domain). Therefore, the use of latch 2006 eliminates race condition.

Flip-flops 2006 and 2007 along with inverter 2008 are coupled in series with the data input of flip-flop 2006 being coupled to the data output of flip-flop 2001. Flip-flop 2006 is clocked by the bus clock signal. The output of flip-flop 2006 (ResetS01H signal) clocks flip-flop 2007 which receives the core clock signal 201 on its data input. The output of flip-flop 2007 is coupled to the input of inverter 2008. The output of inverter 2008 is the core sync signal 2020 and is also coupled to the input of inverter 2009 which feeds back the core sync signal 2020 to one input of NOR gate 2010. The other input of NOR gate 2010 is the output of flip-flop 2006. The output of NOR gate 2010 sets flip-flop 2007.

The external reset signal is received by flip-flop 2001 in response to the bus clock signal 202 and is repeatedly "flopped" to set the correct timing for the reset signal to arrive at the processor core. During the time the reset signal is propagating through the serial chain of flip-flops and latches 2001–2005, the reset is used as a clock to flip-flop 2007 after being provided by flip-flop 2006, which is clocked by the bus clock signal 202. By being clocked in by the bus clock signal 202, the reset signal has the same, or coincident, phase with the bus clock signal 202. When the reset signal from flip-flop 2006 clocks flip-flop 2007, the core clock signal 201 is input into flip-flop 2007. If both the reset signal and the core clock signal 201 have the same phase, then the input "flopped" is the same as the reset signal; otherwise, it is different than the reset signal. If the bus clock signal 202 and the core clock signal 201 are mismatching in phase, then the core sync signal 2020 is zero. If they are matching in phase, the core sync signal 2020 is a one.

The feedback inverter 2009 in conjunction with NOR gate 2010 ensure that core sync signal 2020 preset low when the xxreset# signal 900 at the pin is asserted (i.e., when the system goes into reset).

FIG. 21 illustrates the detector signal waveforms associated with the detector logic of FIG. 20. As shown in FIG. 21, the system reset is de-asserted (i.e., goes high), taking the system out of reset. When this occurs, the reset signal for the processor eventually goes high. However, prior to the processor exiting reset, the core clock signal 201 is sampled at the rising edge of the reset signal 2000 at flip-flop 2003 (the reset signal 502). When this occurs, the core sync signal 2020 goes high if there is a phase mismatch (solid line). If there is no phase mismatch, the core sync signal 2020 remains low (dotted line). Therefore, based on the state of the core sync signal 2020, the correction is made.

As discussed above, correction of the core clock signal 201 is performed by shifting the core clock signal 201 one phase. In one embodiment, in order to shift the core clock signal 201, the present invention uses the 2x frequency of the core clock signal 201 generated from the PLL. The PLL generates twice the frequency of the core clock signal 201 and is divide-by-two (via a divide-by-two counter) to obtain the 50% duty cycle core clock signal. Because the PLL is already generating a 2x frequency clock, the present invention generates a disable pulse to "swallow" one pulse of the 2x clock, thereby delaying one edge of the core clock signal 201 by a core clock phase in one cycle. FIG. 22A illustrates an example of the 2x clock having one of its pulses swallowed. By swallowing one cycle of the 2x frequency clock, a core clock phase is shifted 180°. By performing the shift, synchronization may be obtained.

FIG. 22B illustrates one embodiment of the circuitry and associated waveforms for shifting the core clock phase. The operation of the circuitry would be well-understood by those skilled in the art. The circuit outputs a zero until it detects core and bus clock signals mismatching in phase. At this point, the core sync signal 2020 goes from low to high, thereby causing a pulse of the 2x frequency clock from the PLL to be swallowed. In one embodiment, this circuitry detects not only the transaction of the core sync signal from zero to one but also from one to zero to allow a return to an uncorrected condition. This may be necessary where the clock signals must be placed in a known state for testing.

In an alternate embodiment shown in FIG. 23, the core clock phase is shifted 180° at the rising edge of the reset signal if the core and bus clock signals are not in phase. As with the previous embodiment, the bus clock does not change, so the PLL remains locked. The 180° phase shift is achieved by selecting single inversion or double inversion of an early core clock. The operation of the circuitry in FIG. 23 would be well understood in the art. The early core clock signal is a core clock signal that is created prior to creation of the actual core clock signal to represent the core clock signal when it is not present. This is described in greater detail below. Note that because the delay of the double inversion path cannot be designed to match the delay of the single inversion path in the clock tree over all process, temperatures and supply voltage corners, there will be some clock duty cycle variation between the two paths over the corners. It is conceivable, therefore, that some tests which pass when one path is selected will fail when the other is selected. This may result in test failures and is not reproducible every time. Because of the short coming, the previous implementation is more desirable.

Note that when the core clock is shifted, the present invention ensures that the bus clock signal 202 remains totally unchanged in phase and frequency; otherwise, the PLL will get out of lock and there will not be enough time for the PLL to relock before the integrated circuit starts executing commands. In the present invention, this is accomplished by clocking the counter that generates the bus clock enables by a separate core clock that does not change phase. If the core clock signal 201 has switched phase, the phase at which each of the two bus enables operates must also change so that they generate the bus clock from the correct core clock phase.

After performing a core clock correction, the bus clock enable signals are not accurate. That is, the BusEn1 signal that was selecting a high phase in the core clock signal is now selecting the core clock signal on the low phase. Likewise, the BusEn2 signal that was selected in a low phase of the core clock is now selecting in a high phase. In one embodiment, the bus enable signals can merely be swapped, particularly if it was only generating the bus clock signal. However, when generating the bus clock prime signal, swapping the two bus enable signals does not solve the problem of the bus clock enable signals. In one embodiment, to compensate for this, two sets of bus enables are generated, one that is valid if no correction is performed, while the other is valid if a correction is performed. Therefore, after correction has occurred, the present invention only changes the set of bus enables that are used.

One embodiment of the bus clock enable signal sets for before and after the shift is shown in FIG. 26. Referring to FIG. 26, the bus clock signal 2601 and the core clock signal 2602 are shown. The bus clock enable signal, BusEn1 and BusEn2, before the shift are shown as 2603 and 2604, while those after the shift are 2605 and 2606, respectively.

In an alternate embodiment, a shiftable divide-by-two generates a shifted clock. In the present invention, this shifted core clock signal is synchronized with the unshifted version such that when powering up, they power up the same way. In one embodiment, a shifted core clock is generated and a circuit reconstructs the unshifted clock from the shifted clock so that the two are always synchronized and their relationship is always correct. In one embodiment, a multiplexer may be used and selected based on the state of the core sync signal to either output the shifted clock or an inverted version of the unshifted clock. The unshifted version is used to supply a clock to the divide-by-N circuit described below. FIG. 24 illustrates such an arrangement.

Testing of the Pulse Swallowing Circuitry

In order to test whether a pulse is actually swallowed, the present invention provides a test sequence for the pulse swallowing circuit. The use of the test sequence ensures that the logic that swallows a pulse is tested. More particularly, the present invention allows testing of cases of aligned and misaligned clock signals. The test sequence begins by identifying when the clocks will be aligned after asserting reset. Such an identification may be made by waiting a predetermined number of cycles after reset has been deasserted so that if the clocks were misaligned, the core correction of the present invention would have produced an aligned clock signal. Any large number of cycles would suffice and would be well known to those skilled in the art. After the predetermined number of cycles, reset is asserted and deasserted again, and the device is either tested an even number of clocks or an odd number of clocks after the deassertion. After the testing, the reset is asserted and deasserted again, and the device is tested either an even number of clocks or an odd number of clocks, which ever number of clocks was not selected in the immediately preceding test. By testing in this way, there can be an assurance that the pulse swallowing circuitry of the present invention has been tested.

Reset Counter

In one embodiment, each processor is associated with an L2 cache memory that includes a PLL. During normal operation, the PLL of the L2 is in sync with the PLL of the processor. However, when using a non-integer ratio, there is no guarantee that both PLLs are in sync. Furthermore, by flipping the clock in the processor such as when a pulse is swallowed, synchronization between the PLL in the processor and the PLL in the L2 cache memory may be lost. The present invention provides for a technique to ensure that the two PLLs are in sync.

In the present invention, each PLL is typically comprised of an analog portion and a digital portion. The analog portion typically comprises the portion of the PLL that attempts to lock onto the incoming signal. The digital portion may be the component at the output of the PLL from which a feedback to the input of the PLL is produced. In one embodiment, this digital portion may comprise the pulse swallowing circuitry or a divide-by-N which produces an output and/or a feedback for the PLL. In the present invention, an output of a digital portion of the PLL of the processor provides the input to the PLL of the L2 cache memory. By doing so, any change in the output of the PLL of the processor may cause a similar change in the PLL of the L2 cache memory directly. To compensate for the additional time necessary for the L2 to regain lock, the present invention extends reset internally, thereby allowing the PLL of the L2 cache memory to sync up again. The reset is extended with a reset counter in the external bus control logic. Such a counter may be programmed and operates by preventing the processor from leaving reset until the counter counts out. In one embodiment, such a counter is always operating in this manner. However, such a counter may have to be disabled during testing.

Note that the reset counter of the present invention may be used to cause synchronization in FRC systems as well.

One Embodiment of the 2/N Clocking Circuit

FIG. 25 is a block diagram of the 2/N clocking circuit of the present invention. Referring to FIG. 25, the PLL 2501 generates a 2x frequency signal as one input to pulse swallower 2502. Pulse swallower 2502 also receives a core sync signal. Based on the core sync signal, pulse swallower 2502 either swallows a pulse of the clock signal to shift the core clock signal one phase or not. The output clock from pulse swallower 2502 is received by a divide-by-two 2503.

The output of divide-by-two 2503 is an unshifted early clock signal 2504 and a shifted clock signal 2505. The shifted early clock signal is coupled to clock distribution net 2508 and early bus and core clock generator 2509. The unshifted early clock signal is coupled to divide-by-N 2510, which outputs a signal to bus clock enable generation clock 2505. The outputs of bus clock enable generation block 2511 are two bus clock enable signals which are sent to the clock distribution network 2508 and the early bus and core clock generator 2509.

Clock distribution network 2508 outputs the core clock signal to the processor and generates the bus clock signal from the core clock signal and the two bus clock enable signals. The bus clock signal is also provided to the PLL 2501.

The early bus and core clock generator 2506 generates an early core clock signal and an early bus clock signal which are sent to the detector logic 2507. In one embodiment, these are approximately 4 ns earlier than the regular bus and core clock signals. This early signal allows for shifting the core clock signal when the bus clock signal is not active. If the regular bus clock signal is used, there would not be enough time to perform the shifting. Detector logic 2507 generates the core sync signal to pulse swallower 2502 in response to the system reset signal (and a reset disable counter signal).

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

Thus, a method and apparatus for generating clock signals in an integrated circuit has been described.

We claim:

1. A system comprising:
   a processor comprising a first phase locked loop (PLL) having a digital logic portion with an output and generating a core clock signal;
   a level two (L2) cache memory having a second PLL with an input coupled to the output of the digital logic portion of the first PLL; and
   circuitry to extend an internal reset of the processor to allow the second PLL to resynchronize with the first PLL after the core clock signal has been shifted.

2. The system defined in claim 1 wherein the output is fed back to an input to the first PLL.

3. The system defined in claim 1 wherein the digital logic portion comprises divide-by-N circuitry.

4. The system defined in claim 1 wherein the digital logic portion comprises pulse swallowing logic.

5. The system defined in claim 1 wherein the core clock signal is shifted 180 degrees.

6. The system defined in claim 1 wherein the circuitry comprises a reset counter.

7. The system defined in claim 6 wherein the reset counter prevents the processor from leaving the internal reset until the reset counter counts out.

8. The system defined in claim 6 wherein the reset counter may be programmed.

9. The system defined in claim 1 wherein the first PLL further comprises an analog logic portion for locking on to an incoming signal.

10. The system defined in claim 1 wherein the digital portion of the first PLL may be the component at the output of the first PLL from which a feedback to the input of the first PLL is produced.

11. A method comprising:
    receiving an incoming signal at an analog portion of a phase locked loop (PLL);
    receiving an output signal from a digital portion of the first PLL at a second PLL; and
    synchronizing the second PLL based upon the output signal.

12. The method defined in claim 11 further comprising feeding back the output signal to the first PLL.

13. The method defined in claim 11 wherein the second PLL is synchronized to the first PLL by extending a reset period.

14. A clocking circuit comprising:
    a phase locked loop (PLL), wherein the PLL generates a 2x frequency signal;
    a pulse swallower coupled to the PLL, wherein the pulse swallower is adaptable to swallow a pulse of the 2x frequency signal; and
    divide-by-two circuitry coupled the pulse swallower, wherein the divide-by-two circuitry generates an unshifted early clock signal and a core clock signal.

15. The clocking circuit defined in claim 14 further comprising:
    a clock distribution circuit coupled to the core clock signal; and
    a early core clock generator coupled to the core clock signal.

16. The clocking circuit defined in claim 15 further comprising:
    divide-by-N circuitry coupled to the unshifted early clock signal; and
    a bus enable generator coupled to the divide-by-N circuitry, wherein the bus enable generator transmits a first clock enable and a second bus clock enable to the clock distribution circuit and the early core clock generator.

17. The clocking circuit defined in claim 16 wherein the clock distribution circuit transmits the core clock signal to a processor.

18. The clocking circuit defined in claim 16 wherein the clock distribution circuit generates a bus clock signal from the core clock signal and the first and second bus clock enable signals.

19. The clocking circuit defined in claim 16 further comprising detector circuitry coupled between the early core clock generator and the pulse swallower, wherein the detector circuitry generates a core sync signal based upon an early core clock signal and an early bus clock signal generated by the early core clock generator.

20. The clocking circuit defined in claim 19 wherein the early core clock signal and the early bus clock signal are generated earlier than the bus clock signal and the core clock signal.

21. The clocking circuit defined in claim 19 further comprising a reset counter coupled to the detector circuitry, wherein the detector circuitry transmits the core sync signal to the pulse swallower upon receiving a reset signal from the reset counter.

* * * * *